US 7,788,503 B2

(12) United States Patent
Gatto et al.

(10) Patent No.: US 7,788,503 B2
(45) Date of Patent: Aug. 31, 2010

(54) UNIVERSAL GAME DOWNLOAD SYSTEM FOR LEGACY GAMING MACHINES

(75) Inventors: Jean-Marie Gatto, London (GB); Thierry Brunet De Courssou, Henderson, NV (US)

(73) Assignee: Mudalla Technology, Inc., Palo Alto, CA (US)

( * ) Notice: Subject to any disclaimer, the term of this patent is extended or adjusted under 35 U.S.C. 154(b) by 1134 days.

(21) Appl. No.: 11/400,745

(22) Filed: Apr. 5, 2006

(65) Prior Publication Data

US 2006/0196686 A1    Sep. 7, 2006

Related U.S. Application Data

(60) Division of application No. 11/138,736, filed on May 25, 2005, now Pat. No. 7,337,330, which is a continuation-in-part of application No. 10/789,975, filed on Feb. 27, 2004.

(60) Provisional application No. 60/453,627, filed on Mar. 10, 2003.

(51) Int. Cl.
G06F 11/30 (2006.01)

(52) U.S. Cl. .......................... 713/191; 726/3; 713/156; 713/183; 463/1; 463/29

(58) Field of Classification Search .................. 463/1, 463/29, 46; 713/191, 156, 183; 726/1, 3
See application file for complete search history.

(56) References Cited

U.S. PATENT DOCUMENTS

| 5,265,874 A | 11/1993 | Dickinson et al. |
| 5,290,033 A | 3/1994 | Bittner et al. |
| 5,823,879 A | 10/1998 | Goldberg et al. |
| 5,920,861 A | 7/1999 | Hall et al. |
| 6,048,269 A | 4/2000 | Burns et al. |
| 6,077,163 A | 6/2000 | Walker et al. |
| 6,210,274 B1 | 4/2001 | Carlson |

(Continued)

FOREIGN PATENT DOCUMENTS

| EP | 1480102 A2 | 11/2004 |
| WO | 9852664 | 11/1998 |
| WO | 0225409 A2 | 3/2002 |
| WO | WO 2004/004855 | 9/2002 |
| WO | 2005003855 A2 | 4/2005 |

OTHER PUBLICATIONS

International Preliminary Examination Report of Jan. 2, 2009 in related PCT application PCT/US06/12043 (16 pages).

(Continued)

*Primary Examiner*—Thanhnga B Truong
(74) *Attorney, Agent, or Firm*—Young Law Firm, P.C.

(57) ABSTRACT

A gaming machine may include a locked enclosure and a first computing device disposed within the locked enclosure. The first computing device may be programmed to enable game play of the gaming machine. A second computing device may be provided that is controlled by policies and disposed within the locked enclosure of the gaming machine. The second computing device may be configured for network access. An interface may also be provided between the first and the second computing devices. The second computing device may be configured to receive game software components over the network that are compatible with the first computing device but not compatible with the second computing device and to transfer the received game software components to the first computing device over the interface.

10 Claims, 23 Drawing Sheets

U.S. PATENT DOCUMENTS

| | | | |
|---|---|---|---|
| 6,428,413 | B1 | 8/2002 | Carlson |
| 6,488,585 | B1 | 12/2002 | Wells et al. |
| 6,697,948 | B1 | 2/2004 | Rabin et al. |
| 6,699,128 | B1 * | 3/2004 | Beadell et al. .......... 463/46 |
| 6,749,510 | B2 | 6/2004 | Giobbi |
| 6,776,716 | B1 | 8/2004 | Kita et al. |
| 7,152,158 | B2 | 12/2006 | Watanabe et al. |
| 2001/0029205 | A1 | 10/2001 | Taho et al. |
| 2001/0047348 | A1 | 11/2001 | Davis |
| 2002/0026581 | A1 | 2/2002 | Matsuyama et al. |
| 2002/0068631 | A1 | 6/2002 | Raverdy et al. |
| 2002/0116615 | A1 | 8/2002 | Nguyen et al. |
| 2002/0147040 | A1 | 10/2002 | Walker et al. |
| 2003/0033255 | A1 | 2/2003 | Burton et al. |
| 2003/0211881 | A1 | 11/2003 | Walker et al. |
| 2004/0039911 | A1 | 2/2004 | Oka et al. |
| 2004/0132532 | A1 | 7/2004 | Brosnan et al. |
| 2004/0198496 | A1 | 10/2004 | Gatto et al. |
| 2005/0282637 | A1 | 12/2005 | Gatto et al. |
| 2006/0035713 | A1 | 2/2006 | Cockerille |
| 2006/0046819 | A1 | 3/2006 | Nguyen et al. |
| 2006/0046824 | A1 | 3/2006 | Silva et al. |
| 2007/0048714 | A1 | 3/2007 | Plastina et al. |

OTHER PUBLICATIONS

International Search Report mailed Feb. 28, 2008, in related International Application No. PCT/US07/81574, filed Feb. 2, 2007.
Written Opinion of the International Searching Authority mailed Feb. 28, 2008, in related International Application No. PCT/US07/81574, filed Feb. 2, 2007.
Office Action mailed Oct. 19, 2007, in related U.S. Appl No. 10/789,975, filed Feb. 27, 2004.
Notice of Allowance mailed Nov. 21, 2007, in related U.S. Appl. No. 11/138,736, filed May 25, 2005.
Office Action of May 19, 2009 in related U.S. Appl. No. 11/277,026 and Notice of References Cited (7 pages).
MSDN Library, "RefreshPolicy" (downloaded on Feb. 19, 2004).
MSDN Library, "RegisterGPNotification" (downloaded on Feb. 12, 2004).
MSDN Library, "RefreshPolicyEx" (downloaded on Feb. 12, 2004).
Microsoft TechNet, MSIEXE command at http://www.microsoft.com/technet/prodtechnol/winxppro/proddocs/msiexec.asp (downloaded on Feb. 16, 2004).
Microsoft Next-Generation Secure Computing Base ("NGSCB") (downloaded on Feb. 16, 2004).
Microsoft Corporation, "Designing a Public Key Infrastructure" Chapter 12.
Microsoft Corporation, "Using Software Restriction Policies to Protect Against Unauthorized Software" Microsoft Windows XP and Windows.NET Technical Article, pp. 1-50 (Jan. 2002).
M. Myers et al., "Certificate Management Messages over CMS", ftp://ftp.isi.edu/in-notes/rfc2797.txt (Apr. 2000).
R. Housley et al., "Internet X.509 Public Key Infrastructure Certificate and Certificate Revocation List (CRL) Profile", ftp://ftp.isi.edu/in-notes/rfc3280.txt (Apr. 2002).
M. Nystrom et al., "PKCS #10: Certification Request Syntax Specification Version 1.7", ftp://ftp.isi.edu/in-notes/rfc2986.txt (Nov. 2000).
Enterprise News and Reviews, "Microsoft: Why Longhorn Matters", http://www.eweek.com/article2/0,1759,1786193,00.asp, printed Apr. 15, 2005.
Mary Jo Foley, "Microsoft dusts off 'Palladium' security for Longhorn", Microsoft Watch, http://www.microsoft-watch.com/article2/0,1995,1786571,00.asp, printed Apr. 15, 2005.
Paula Rooney, "Ballmer Touts Interop with Sun, Trusted Computing Group", http://www.crn.com/sections/breakingnews/breakingnews.jhtml?articleId=160911712, printed Apr. 20, 2005.
Microsoft Corp., "Microsoft CEO Steve Ballmer Affirms Commitment to Dynamic Systems Initiative", Press Release, printed Apr. 20, 2005.
Sygate Technologies, "Sygate Supports Microsoft and Trusted Computing Group Alignment for Defining Endpoint Enforcement Standards", Press Release, printed Apr. 20, 2005.
Sygate web site, "Policy Enforcement", printed Apr. 20, 2005.
Barbara Darrow and Paula Rooney, "Allchin Talks Turkey About Longhorn", http://www.crn.com/sections/breakingnews/dailyarchives.jhtml;jsessionid=2P2WCO1SRT, printed Apr. 18, 2005.
Microsoft manual, "Windows Installer v3.0 RC1 (MSI3.0)", Published Sep. 2003, Revised Mar. 2004, 27 pgs.
Microsoft manual, Windows Installer v3.0 RC1 Patch Sequencing (Draft Whitepaper), Published Mar. 2004, 51 pgs.
Microsoft manual, "Using Administrative Template Files with Registry-Based Group Policy", Published Sep. 2004, 58 pgs.
Microsoft, "Frequently Asked Questions About Windows Installer", Published Aug. 26, 2002, http://microsoft.com/windows2000/community/centers/management/msi_faq.mspx, printed May 5, 2005.
Microsoft, "How to add a Windows 2000 ADM template to a Group Policy snap-in in Office XP", http://support.microsoft.com/default.aspx?scid=kb;en-us;307732, printed Apr. 15, 2005.
Microsoft, "Using Administrative Template Files with Registry-E Group Policy", published Oct. 11, 2004, 41 pgs, http://www.microsoft.com/technet/prodtechnol/windowsserver2003/technologies/manage..., printed Apr. 15, 2005.
International Search Report mailed May 11, 2005, in related International Application No. PCT/US2004/006045, filed Feb. 27, 2005 (3pgs).
Written Opinion mailed May 11, 2005, in related International Application No. PCT/US2004/006045, filed Feb. 27, 2005 (10pgs).
Office Action mailed Jun. 30, 2005, in parent U.S. Appl. No. 10/789,975, filed Feb. 27, 2004 (14pgs).
International Search Report dated Mar. 30, 2007, in related International Application No. PCT/US06/35560, filed Sep. 12, 2006.
Written Opinion dated Mar. 30, 2007, in related International Application No. PCT/US06/35560, filed Sep. 12, 2006.
International Search Report dated Apr. 20, 2007, in related International Application No. PCT/US06/10926, filed Mar. 24, 2006.
Written Opinion dated Apr. 20, 2007, in related International Application No. PCT/US06/10926, filed Mar. 24, 2006.
International Preliminary Report on Patentability dated Jun. 5, 2007, in related International Application No. PCT/US04/06045, filed Feb. 27, 2004.
Office Action mailed Jun. 27, 2007 in related U.S. Appl. No. 11/138,736, filed May 25, 2005.
Final Office Action mailed May 13, 2008, in parent U.S. Appl. No. 10/789,975, filed Feb. 27, 2004.
Office Action mailed May 13, 2008, in related U.S. Appl. No. 11/277,026, filed Mar. 20, 2006.
International Search Report and Written Opinion of the International Searching Authority in related PCT application PCT/US08/60899, mailed Aug. 22, 2008.
International Preliminary Report on Patentability in related PCT application PCT/US06/10926, mailed Oct. 1, 2008.
Office Action mailed Mar. 29, 2006, in parent U.S. Appl. No. 10/789,975, filed Feb. 27, 2004.
Final Office Action mailed Oct. 11, 2006, in parent U.S. Appl. No. 10/789,975, filed Feb. 27, 2004.
Office Action mailed Jun. 13, 2006, in parent U.S. Appl. No. 11/138,736, filed May 25, 2005.
International Search Report mailed Sep. 19, 2007, in related International Application No. PCT/US06/12043, filed Mar. 31, 2006.
Written Opinion of the International Searching Authority mailed Sep. 19, 2007, in related International Application No. PCT/US06/12043, filed Mar. 31, 2006.
Notice of Allowance mailed Nov. 21, 2007, in related U.S. Appl. No. 11/138,736, filed May 25, 2005.
EP Extended Search Report of Sep. 9, 2009 in related EP Appln. 06739611.9.

* cited by examiner

FIG. 4

Certificate

| General | Details | Certification Path |

Show: Extensions Only

| Field | Value |
|---|---|
| Basic Constraints | Subject Type=End Entity, Pat... |
| Certificate Policies | [1]Certificate Policy:Policy Ide... |
| Netscape Cert Type | SSL Client Authentication (80) |
| 2.16.840.1.113733.1.6.7 | 16 04 4e 6f 6e 65 |
| CRL Distribution Points | [1]CRL Distribution Point: Distr... |

1/21

Edit Properties...    Copy to File...

OK

400

UNIVERSAL GAME DOWNLOAD SYSTEM FOR LEGACY GAMING MACHINES

CROSS-REFERENCE TO RELATED APPLICATIONS

The present application is a divisional of application Ser. No. 11/138,736, filed May 25, 2005, which is a continuation-in-part of application Ser. No. 10/789,975, filed Feb. 27, 2004, which claims the benefit of provisional application Ser. No. 60/453,627, filed Mar. 10, 2003, all applications of which are hereby incorporated herein by reference in their entirety, and from which applications priority is hereby claimed under 35 U.S.C. §119(e) and §120.

BACKGROUND OF THE INVENTION

1. Field of the Invention

The present inventions relate generally to the field of network connected pay computer-controlled games, either games of skills or games of chance, and more particularly to the field of automated monitoring and control of a large number of clusters of pay gaming terminals. The gaming terminals may be slot machines, video lotteries, bingo systems or lottery terminals in all their forms; that is, desktop terminals, wall or pedestal mounted kiosks, or full size consoles, operating either in a local area network (LAN) or in a wide area network (WAN). The present inventions also relate to the monitoring, control and payment systems linked to the gaming terminals.

2. Description of the Prior Art and Related Information

Pay entertainment and gaming systems of the prior art, either of the cash-in or the cash-less type, are seriously limited due to the technical choices made in order to comply with gaming regulatory requirements. Regulators are mainly concerned with funds that may be illegally acquired by individuals as well as with funds that may not be acquired by legitimate winners as a result of flaws, cheating and/or stealing. Game regulators are reluctant to accept state-of-the-art operating systems, multimedia and Internet technologies because of security concerns and tend to favor antiquated technology based upon secrecy rather that "open" state-of-the-art technology. A "Request/Authorize" method for downloadable games has been proposed by another company (IGT's Secure Virtual Network in a Gaming Environment—Publication US2002/0116615 A1) but the method disclosed therein does not cover how to ensure that only certified authorized components may execute.

Although downloadable games are undeniably going to flourish, they have yet to create confidence within the regulatory arena.

SUMMARY OF THE INVENTION

Embodiments of the present invention overcome the security limitations of the prior art and allow game operators the flexibility to dynamically configure their estate of gaming terminals. It is to be noted that although the gaming industry has coined the term "downloadable game" and that gaming standard GLI-21 entitled "Game Download System" has been published by Game Laboratory International (GLI), the term downloadable game is rather restrictive, as the downloading of software components to computer terminals and computer servers is by itself pervasive in any network distributed computer system. However, downloading certified game components in a secure manner is a problem that has yet to find a satisfactory solution.

Embodiments of the present invention may allocate an individual PKI certificate to each executable software component and each of its versions, binding the PKI certificate to the executable software and associating a distinctive policy for each PKI certificate. The PKI certificate's "Subject Name" (or "Issued to" field, or "CommonName" field) may be a concatenation of the software component identification, its version number and optionally other identification characters, for example.

According to other embodiments, the present invention offers a method to enable dynamic configuration of gaming terminals installed in one or a plurality of gaming premises whereby certified games, certified data files and certified support software components may be activated in accordance with a predetermined schedule or automatically in response to the observed gaming activity. This may be accomplished by configuring and then enforcing the software execution policies for selected PKI certificates in accordance with the desired authorized game configuration and schedule.

Further embodiments of the present invention offer a method to ensure the trust of non-executable files such as initialization or configuration files, video files, sound files, multimedia files, file containing list of hashes, CRCs, and/or signatures. This method relies on the certificate Software Restriction Policy as described herein.

Still further embodiments of the invention enable the certification authority to bind the certificates to the tested software components.

The present invention, according to still further embodiments thereof enables a dynamic generation of the list of games made available to the players without transferring a configuration file or files from the central server to the gaming machines. For example, a method according to an embodiment of the present invention relies on attempting to execute a game component on which a certificate Software Restriction Policy is enforced.

Embodiments of the present invention leverage the technology described in commonly assigned application Ser. No. 10/520,831, filed Jan. 5, 2005, the application of which is hereby incorporated herein in its entirety, in which code signing and Software Restriction Policy enable executing authorized game software. Code signing and Software Restriction Policy (SRP) technologies are available in Microsoft Windows XP, Windows 2000 and Windows 2003, Embedded Windows XP as well as in future Windows versions (as of this writing, the next version is code-named "Longhorn") to ensure that only executable software components from a trusted publisher, let's say "Microsoft", are allowed to run. Code signing and Software Restriction Policy technology are applied to executable components such as *.exe, *.dll, *.ocx, *.vbs, *.msi, *.cab, etc. In addition, Software Installation Policy (SIP) ensures that software components are installed in a controlled fashion. Embodiments of the present invention extend the use of code signing, Software Restriction Policy and Software Installation Policy to individual software components that are allowed to execute in a network connected gaming system by associating a distinctive code-signing certificate to each executable software component. Each executable software component version (usually comprising major version, minor version, revision and build) may have a unique certificate. A distinctive certificate may be created for each software component version and the two entities (the compiled code and the certificate) may be bound together by a code signing operation, herein called "signcode.exe".

Code signed software components may be packaged together with non-signed software components (if any) into a MSI Microsoft installation package (MSI=Microsoft Software Installation). An MSI package is an executable component that in turn receives a distinctive certificate bound to its content by a code signing operation. Only the software component version that has successfully passed the regulatory certification process may be allowed to run by enforcing an unrestricted policy to the associated certificate.

Moreover, embodiments of the present invention extend the use of code signing and Software Restriction Policy to ensure that only authorized non-executable components are used by the authorized executable components. This is of particular value for configuration files or media files that may affect the game outcome such as fixing the return to player at, for example, 95% between 5:00 PM and 11:00 PM, or at 98% during other time periods. For this, non-executable components may be placed in code signed MSI (Microsoft Software Installation) installation packages. Each individual MSI package is an executable component whose execution can be controlled by Software Restriction Policy (SRP). A distinctive certificate may be created for each package version (a part number is created for a preselected aggregate of non-executable components) and the two entities may be bound together by the code signing operation "signcode.exe". Within the network connected gaming system, trust for non-executable components may be established by executing the associated authorized code signed packages using SRP upon computer startup or alternatively on demand, resulting in the re-installation of the original non-corrupted non-executable components. The non-executable components may be: initialization or configuration files, video files, sound files, multimedia files, file containing list of hashes, CRCs, and/or signatures, for example.

For example, DRM (Digital Rights Management) technology offered by Microsoft Windows Media Player may be used to ensure that only authorized multimedia files may be played or viewed.

Also, RM (Rights Management) technology offered with Microsoft Office 2003, with the associated RM services and SDK (Software Development Kit) may be used to ensure that only authorized data files may be accessed, viewed, copied or modified.

Software Installation Policy (SIP) and Software Restriction Policy (SRP) configured with an individual PKI certificate associated to each authorized software component offer a "Policy/Enforce" model, or in other words a "Configure the Policy and then Enforce the Policy" model to enable network installation (or "game download") and activation at predetermined times (or "game scheduling") of selected authorized software components, in order to control the software of the network connected gaming system and offer selected games to players. This "Policy/Enforce" method may be constructed on a demonstrable trusted base; it offers transparent security and fine-grained auditing, contrasting with conventional "Request/Authorize" methods that do not demonstrate reliance on a trusted base to enforce the use of only trusted software components.

A network-connected gaming system comprises hundreds of authorized certified software components that may be selectively downloaded and scheduled. Considering on-going support for 50 customers and for 200 distinctive games over a period of 5 years, tens of thousands of software components will each need to receive individual certificates and be certified. Accordingly, embodiments of the present invention include an automated certification platform. Herein, such a certification platform is denoted "Integrated Certification Environment" or ICE. Embodiments of such a certification platform according to the present invention are designed to automate the stepping through the procedure that must be done by the regulatory certification authority to produce only authorized software components that may be dynamically installed in a gaming system, and to prevent generation of erroneous software components. In addition, the ICE offers support to selectively enable the download of approved system software components using Microsoft Software Update Services (SUS), for example.

Embodiments of the present methods rely on established security standards and a demonstrable trusted base (as opposed to relying on security by secrecy) in order to offer transparent security and allow fine-grained auditing. Embodiments of the present inventions are also applicable to any of the subsystems available in a network connected gaming system that require preventing non-authorized software components from executing or affecting the game outcome, such as the gaming terminals, the game management system (CMS or MCS) that monitor and control whole or part of the estate of gaming machines, the progressive jackpot systems, the bonusing systems as well as game payment verification systems such as IGT's EasyPay and Cyberview's PVU (Payment Verification Unit) and PVS (Payment Verification System). Gaming subsystems may be tested against gaming standards such as those produced by GLI; the game standards are mandated by game regulators in accordance with local regulation and laws. The network-connected subsystems may be located within the premises accommodating the estate of gaming machine (connection via a LAN) or outside of the premises (connection via a WAN).

Other embodiments of the present invention enable a dynamic configuration of legacy gaming machines, which include PC based and non PC-based gaming machines, gaming machines that do not run a version of Microsoft's Windows® operating system, for example, or do run older, limited, or non secure network enabled operating systems.

According to an embodiment thereof, the present invention is a gaming machine that may include a locked enclosure; a first computing device disposed within the locked enclosure, the first computing device being programmed to enable game play of the gaming machine; a second computing device controlled by policies and disposed within the locked enclosure of the gaming machine, the second computing device being configured for network access, and an interface between the first and the second computing devices, the second computing device may be configured to receive game software components over the network that may be compatible with the first computing device but not compatible with the second computing device and to transfer the received game software components to the first computing device over the interface.

The first computing device may be configured to execute the game software components received by the second computing device, and the second computing device may be configured so as to be unable to execute the received game software components. The gaming machine may be a non PC-based gaming machine. The gaming machine may be a PC-based gaming machine that is not capable of securely receiving game software components over the network. The second computing device may include a PC. The second computing device may run a version of the Microsoft Windows® operating system, for example. The first computing device may include a ROM and the interface may include a ROM emulator and the received game software components transferred via the interface to the emulator may be executable by the first computing device. The first computing device may include a plurality of ROMs and the interface may include a multi-ROM emulator configured to couple to selected ones of the plurality of ROMs and the received game software components transferred via the interface to the emulator may be executable by the first computing device. The policies may be controlled by .ADM administrative scripts or equivalent commands configured by a central server. The second computing device may be configured with a local password configured by a central server. The second computing device may be configured with a local password configured randomly by a central server.

BRIEF DESCRIPTION OF THE DRAWINGS

FIG. 4 illustrates the information that may be entered in the Extended Attributes of a PKI certificate, according to an embodiment of the present invention.

DETAILED DESCRIPTION

Reference will now be made in detail to the construction and operation of preferred implementations of the present invention illustrated in the accompanying drawings. The following description of the preferred implementations of the present invention is only exemplary of the invention. The present invention is not limited to these implementations, but may be realized by other implementations.

Figure 1:
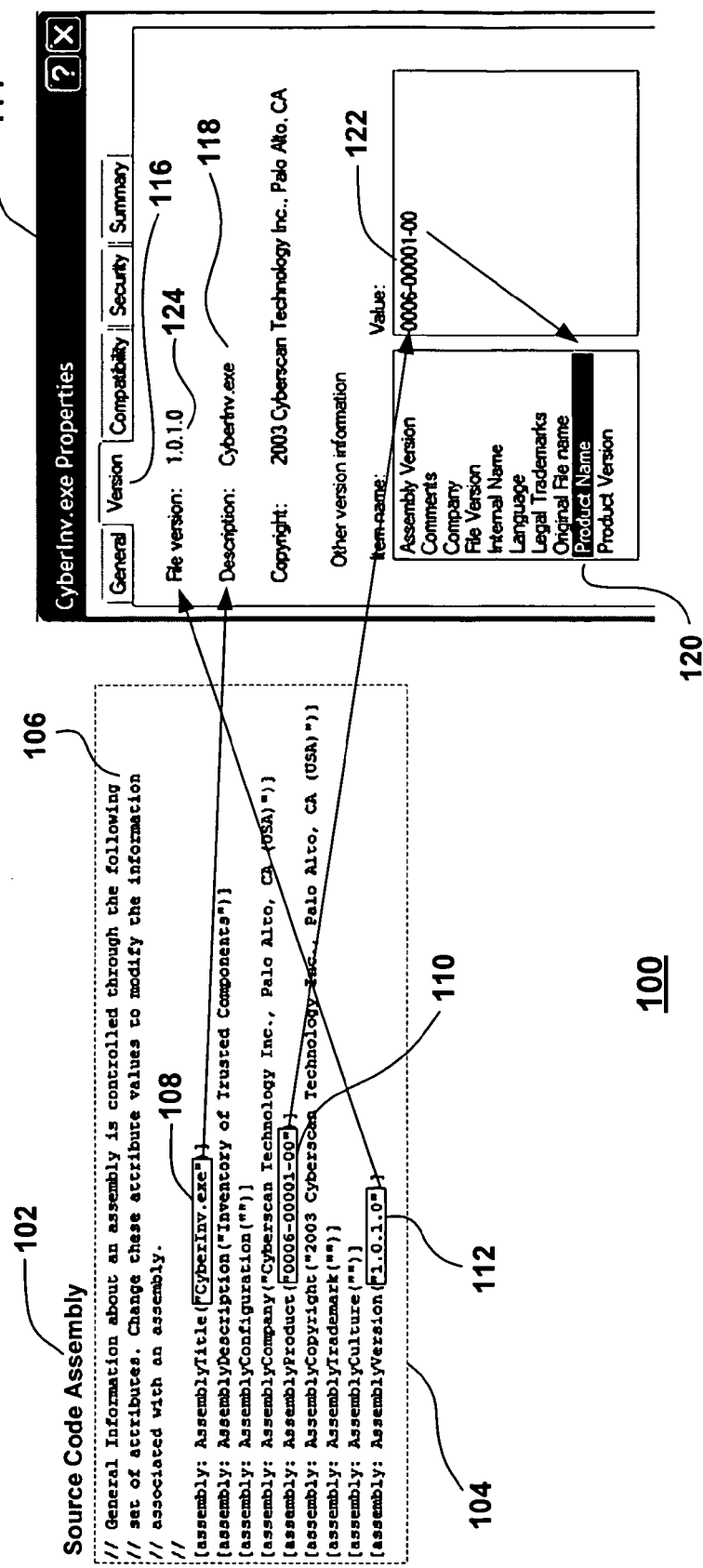
FIG. 1 illustrates the intrinsic information that uniquely identifies each executable software component, according to an embodiment of the present invention.

FIG. 1 illustrates Software Component Identification and Traceability via File Properties, according to an embodiment of the present invention. Shown at 100 in FIG. 1 is the intrinsic information that uniquely identifies each executable software component. The executable component source code comprises executable code lines (e.g. X=X+1; not shown here) and associated source code assembly information 102, 104 that comprises comment lines 106 and assembly information. Herein, AssemblyTitle 108, AssemblyProduct 110 and AssemblyVersion 112 are configured. The AssemblyTitle 108 is set to CyberInv.exe that is the friendly name of the executable software component; AssemblyProduct 110 is set to 0006-00001-00 that is the part number of the executable software component and AssemblyVersion 112 is set to 1.0.1.0, which is the version number of the executable software component. Once the source code is compiled and the executable is built (CyberInv.exe in this case), the configured assembly information is available via the File Property of Windows 114 when right clicking on the file CyberInv.exe and selecting "Properties" and "Version", as shown at 116. The friendly name is shown in the Description field 118, the part number is shown in the Product Name field 120, 122 and the version is shown in the File Version field 124.

It will be apparent to those of skill in the art of software development that intrinsic information that uniquely identifies each executable software component may be obtained in various combinations of assembly directives and file property fields. Additional information may be configured such as, for example, the software component part number, major version number, minor version number, build number, revision number, project name, type of software component, language variant, game regulation variant, friendly name, identification of the certification laboratory, identification of the client, and other predetermined identification identifiers. The identifiers associated with the executable software component using source code assembly directives may, therefore, be traceable via the File Property features of the Windows operating system.

An example of such a configuration is CST3000-0006-00001-00[1.0.1.0]{21}^11~9% S CyberInv.exe that comprises a concatenation of identifiers that may be used in a file name or a PKI certificate subject name. According to this example, CST3000 is the marketing system product identification or the project name; 0006-00001-00 is the software component part number; [1.0.1.0] details the software component major version number, minor version number, build number, revision number; {21} is the software component variant identifier; ^11 identifies the certification lab that certifies the software component; ~9 identifies the customer for which this software component is certified; % S is the software component language variant ("S" for Spanish in this example); CyberInv.exe is the software component friendly name for quick identification. Spaces may be used freely and the identifier fields may be written in any order so as to facilitate reading. Identifier fields may be omitted whenever the context already provides such information. The framing or delimiter characters such as [ ], { }, ~, ^, % which are allowable characters to be used in file names and certificate subject names facilitate human recognition as well as string searches for particular attributes (global search for all Spanish variants for example).

In the same manner, a selected set of identification information making up the certificate subject name may be used for making up the file name of PKI certificate related files such as *.CER, *.P7B and *.PVK such as to facilitate human identification, string searches and file searches.

Figure 2:
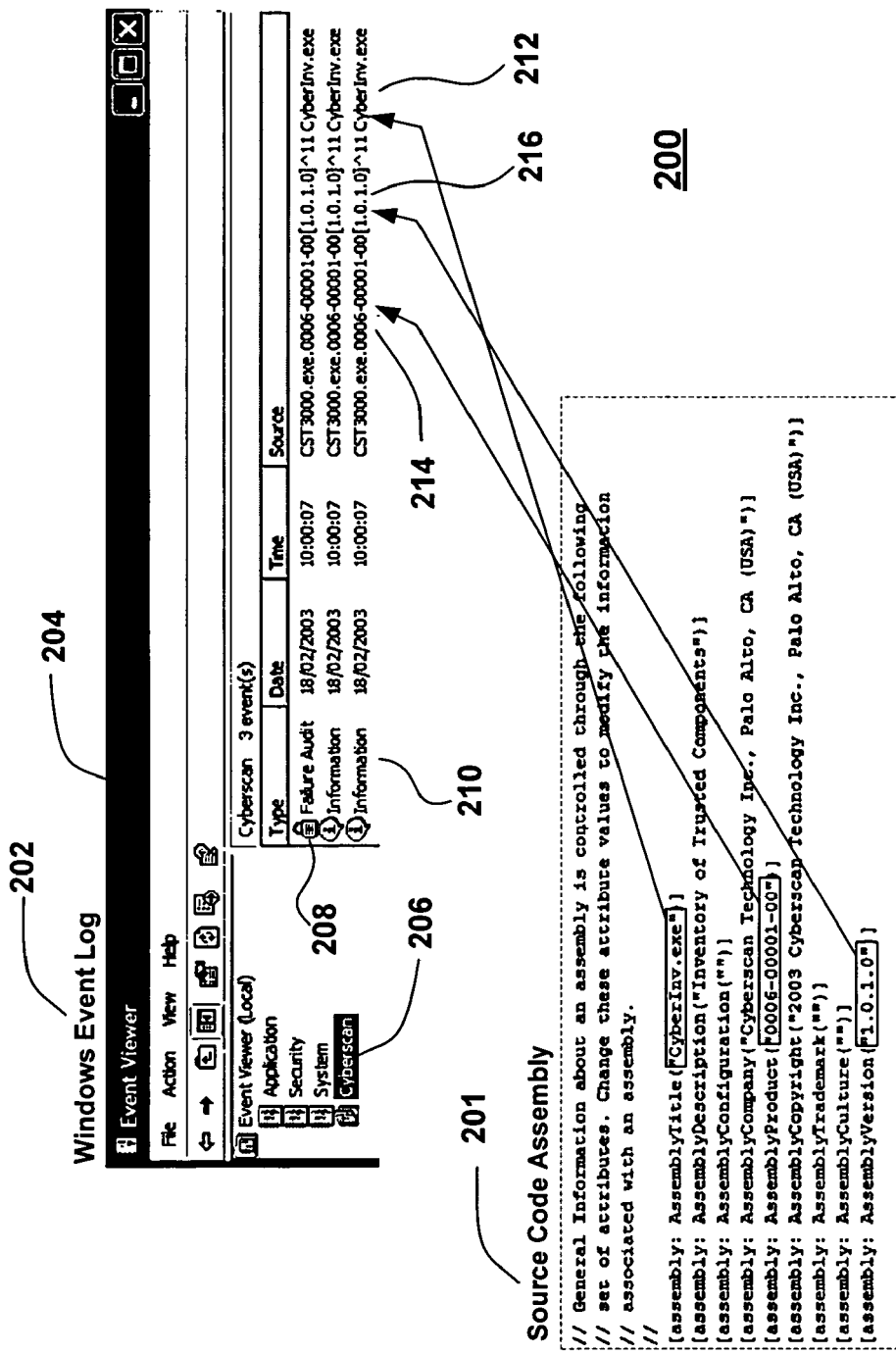
FIG. 2 illustrates the information uniquely identifying each executable software component being made available into the Windows Event Log upon execution of the software component, according to an embodiment of the present invention.

FIG. 2 illustrates traceability via the Windows Event Log. Reference numeral 200 in FIG. 2 illustrates the information uniquely identifying each executable software component being made available to the Windows Event Log upon execution of the software component. The Windows Event Log 202 is a repository for logging important events; it is viewed via the Event Viewer 204. Windows default event log bins (or containers) are Application, Security and System. In the illustrated example, an Event Log bin 206 denominated "Cyberscan" has been added. The Cyberscan bin 206 contains traceability information in its "Source" field that is being logged by each of the executable software components. The software executable software component makes use of the Event Log API to "splash" its identification information into the source field of a predetermined bin in the Windows Event Log each time it starts execution, or at any other time should the occurrence of an event be traced, in order to provide an audit trail to be examined by auditors. The part number 214, version 216 and friendly name 212 identifiers associated to the executable software component using source code assembly directives 201 are therefore traceable via the Event Log features of the Windows operating system. Other information associated with the executable software component may be splashed into the event log for additional traceability. The "Type" field 208 may flag an important audit condition such as here "Failure Audit" to alert the auditor.

Figure 3:
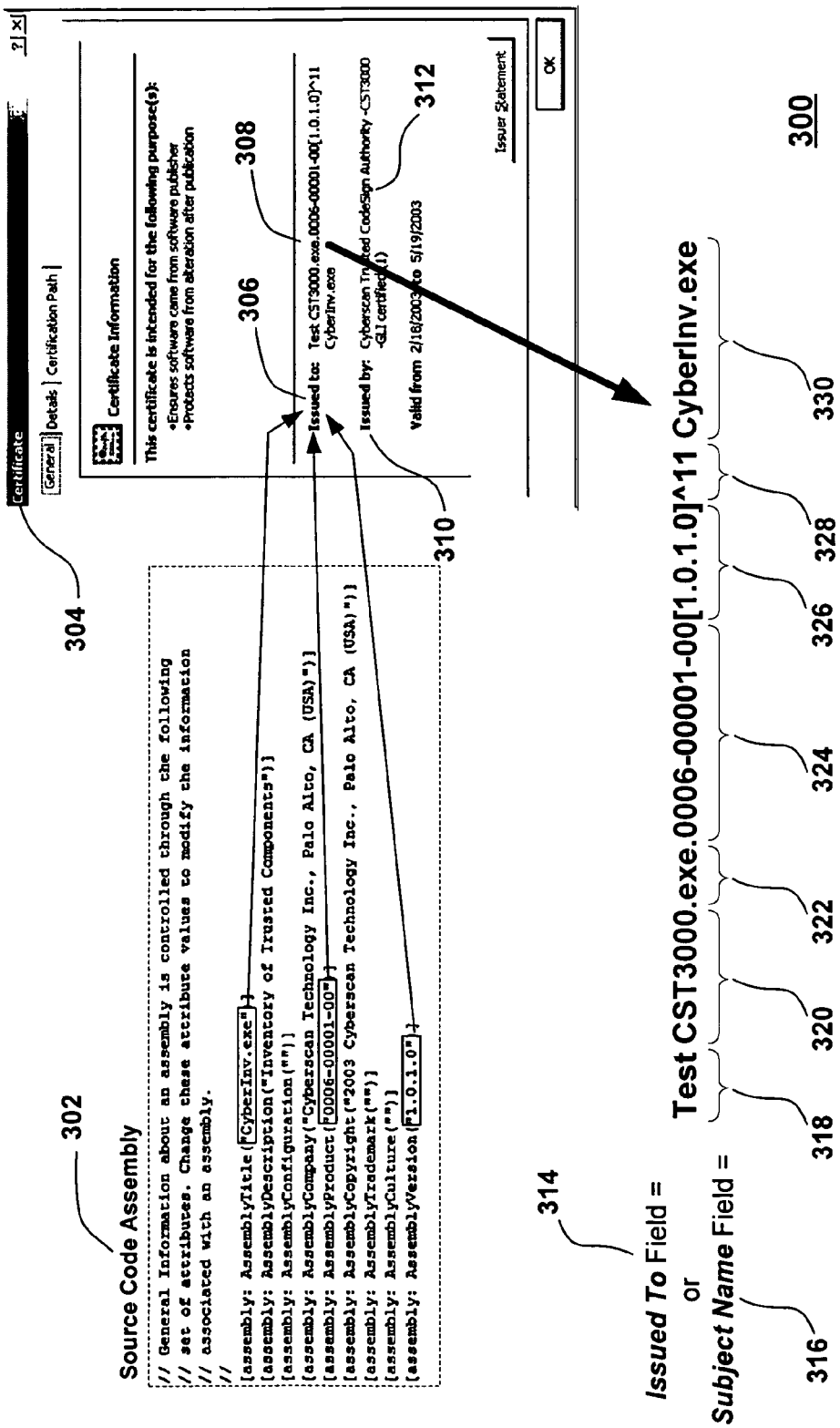
FIG. 3 illustrates the information (test certificate indicator, project/product code, type of executable code, part number, major/minor/build/version, certification lab identifier, friendly name) uniquely identifying each executable software component being used to generate the "Subject Name" (or "Issued to" field, or "CommonName" field) of the individual PKI certificate associated to each executable software component, according to an embodiment of the present invention.

FIG. 3 illustrates the Certificate "Issued to" Field. Reference numeral 300 illustrates the information 308 (test certificate indicator 318, project/product code 320, type of executable code 322, part number 324, major/minor/build/version 326, certification lab identifier 328, friendly name 330) uniquely identifying each executable software component being used to generate the "Subject Name" 316 (or "Issued to" field 306, 314, or also known as the "CommonName" field) of the individual PKI certificate 304 associated with each executable software component, according to an embodiment of the present invention. The friendly name, part number and version of the executable software components may be substantially identical to those entered in the source code assembly 302. "Subject Name" 316 and "Issued to" field 306, 314 refer to the same information; Subject Name is preferably used hereafter. The certificate authority 312 responsible for generating the PKI certificate is shown in the "Issued by" field 310.

FIG. 4 at 400 illustrates the information that may be entered in the Extended Attributes 408 of a PKI certificate 402, according to an embodiment of the present invention. This information may be viewed by selecting, for example, the "Details" tab 404 of the certificate 402 and selecting "Extensions Only", as shown at 406. Intrinsic information that uniquely identifies each executable software component may be entered in the extended attributes of a PKI certificate in order to attain the same purpose as described for FIG. 3 as an alternative to entering the information in the certificate Subject Name. In the same manner, additional identification information to those entered in the Subject Name may be entered in the extended attributes.

Figure 5:
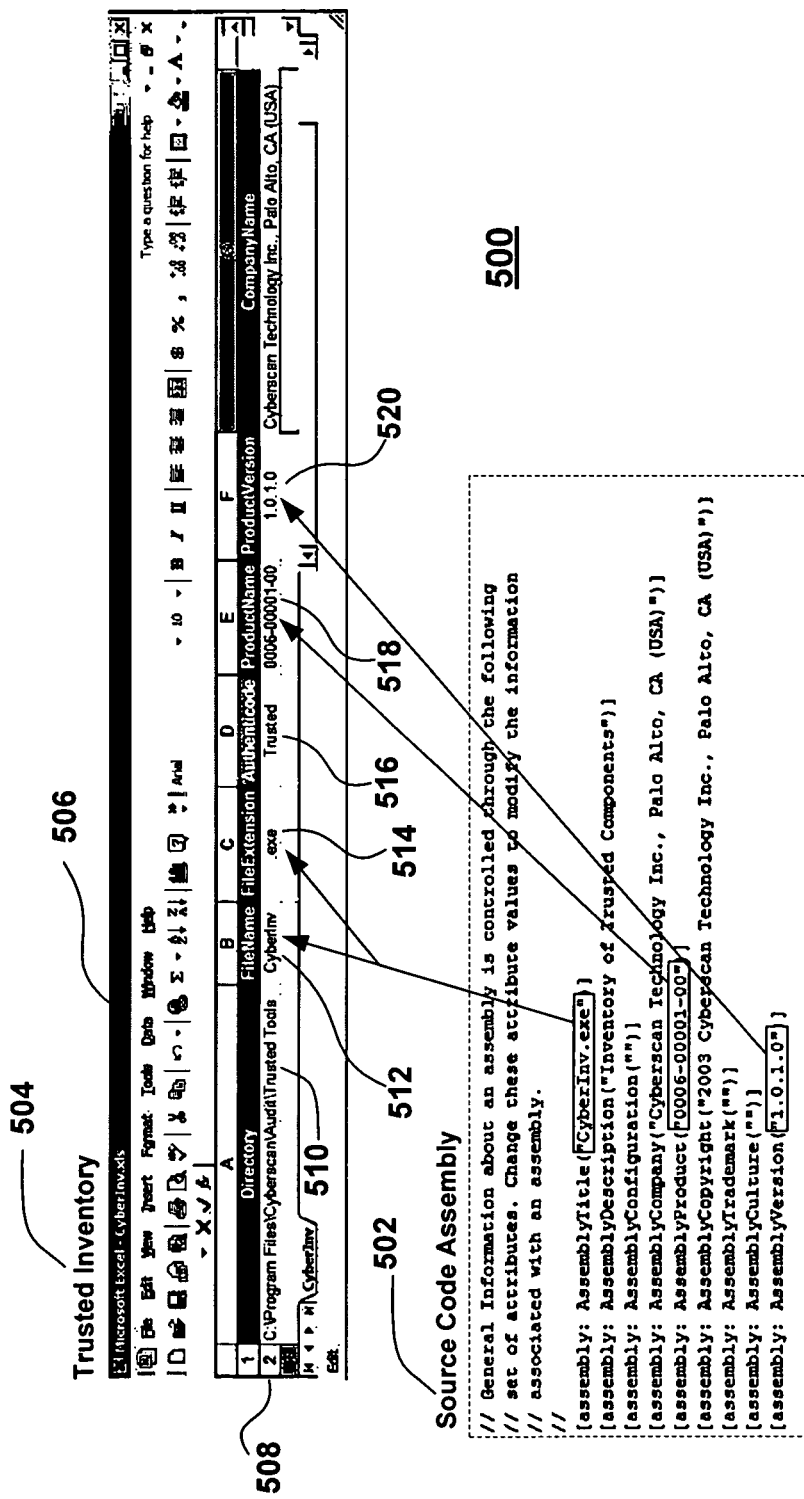
FIG. 5 illustrates the information that may be obtained using the Trusted Inventory tool, according to an embodiment of the present invention.

FIG. 5 illustrates traceability via the Trusted Inventory Tool 504, according to an embodiment of the present invention. Reference numeral 500 in FIG. 5 illustrates the information that may be obtained using the Trusted Inventory tool 504. The trusted inventory tool 504 is a simple application that searches for executable files through the branches of a given tree directory and determines whether the executable software component may be trusted by, for example, calling the Microsoft ChkTrust.exe tool. If the executable software component is signed by a valid PKI certificate and its executable binary data is uncorrupted (its recalculated hash matches the code signature), the ChkTrust.exe tool returns the authenticode "Trusted" attribute; an "Untrusted" attribute is returned otherwise. The Trusted attributes are automatically tabulated in a spreadsheet such as, for example, Microsoft Excel as depicted at 506. Each line 508 in the table provides details on the executable software component that is being examined, such as program path location 510, friendly name 512, executable type 514, authenticode trusted attribute 516, part number 518 and version 520. According to an embodiment of the present invention, therefore, the part number 518, version 520 and friendly name 512 514 identifiers associated with the executable software component using source code assembly directives 502 are traceable via the Trusted Inventory tool.

Figure 6:
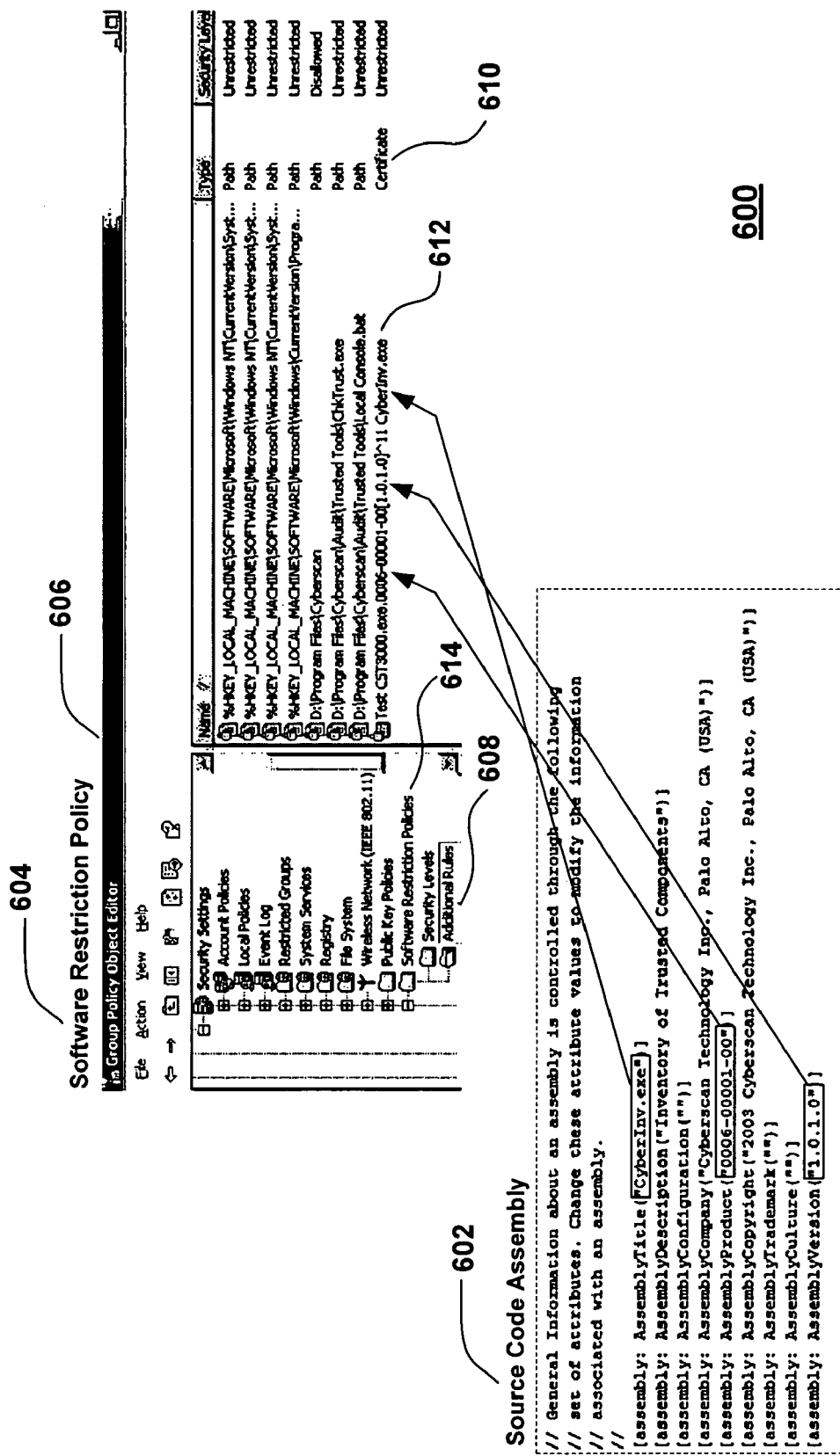
FIG. 6 illustrates the information that may be entered to configure a type-certificate Software Restriction Policy rule, according to an embodiment of the present invention. A Software Restriction Policy (SRP) is configured using the Group Policy Object Editor.

Reference numeral 600 in FIG. 6 illustrates the information that may be entered to configure a type-certificate Software Restriction Policy rule. A Software Restriction Policy (SRP) 604 may be configured using the Group Policy Object Editor 606. The type-certificate Software Restriction Policy rule 610 may be entered in the "Additional Rules" node 608 of the Software Restriction Policy object 614. In FIG. 6, the part number, version and friendly name configured in the source code assembly 602 are recognizable in the certificate subject name 612.

Figure 7:
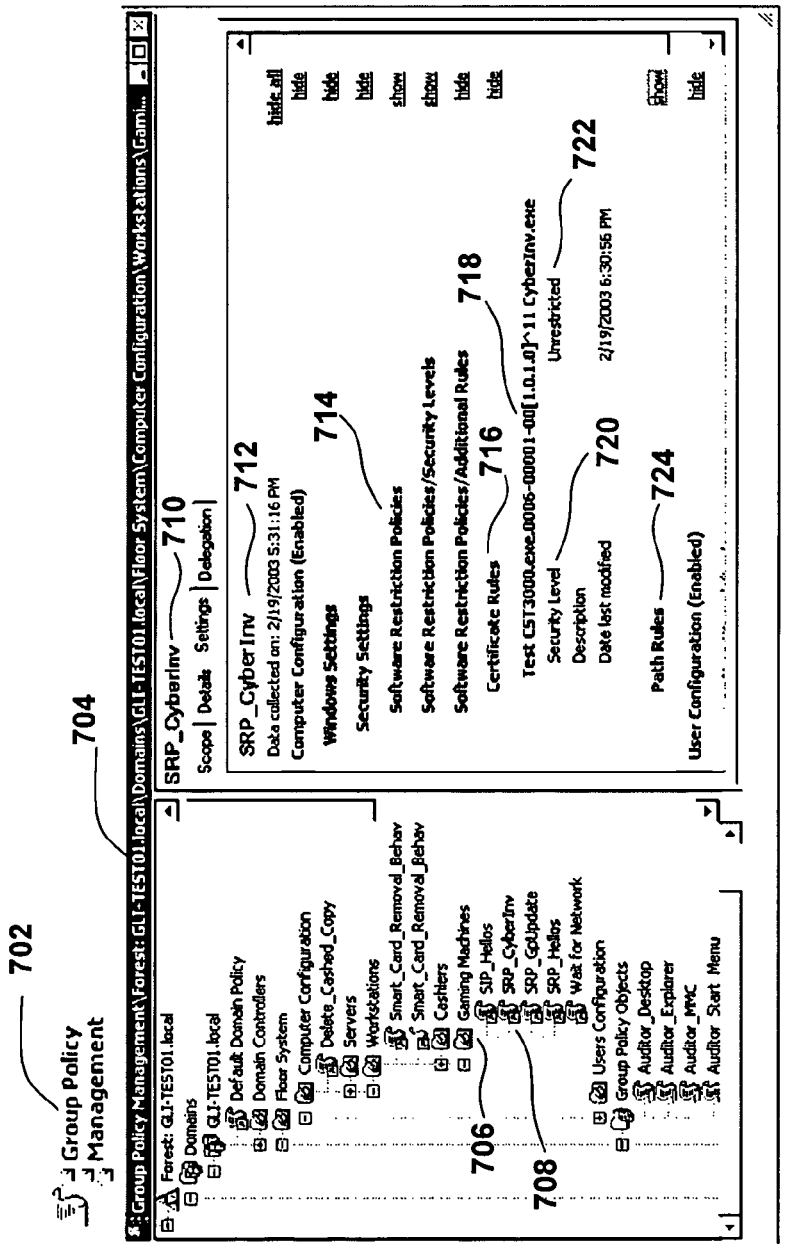
FIG. 7 illustrates the policies that are associated to the active directory container used to configure the gaming machines, according to an embodiment of the present invention.

FIG. 7 illustrates SRP Certificate Rules Policies via the Group Policy Management Console, according to an embodiment of the present invention. Reference numeral 700 in FIG. 7 illustrates the policies that are associated to the active directory container used to configure the gaming machines referenced at 706. Policies are managed using the Group Policy Management Console 702, 704. In this illustration, a policy named "SRP_CyberInv" 708, 710, 712 is selected, for the purpose of viewing a detailed report of the rules that are configured. The report shows details in a hierarchical order. This exemplary policy defines only one certificate rule 716 in the Software Restriction Policy node 714. The certificate subject name 718 is set with a security level 720 of "Unrestricted", as shown at 722, thus ensuring that only the executable software component identified in the certificate subject name is authorized to execute when the policy 714 is enforced. The SRP path rules 724 must be configured such as to prevent non-authorized software from executing. The policy 708 is enforced when it is linked to its container object 706 herein named "Gaming Machines".

Figure 8:
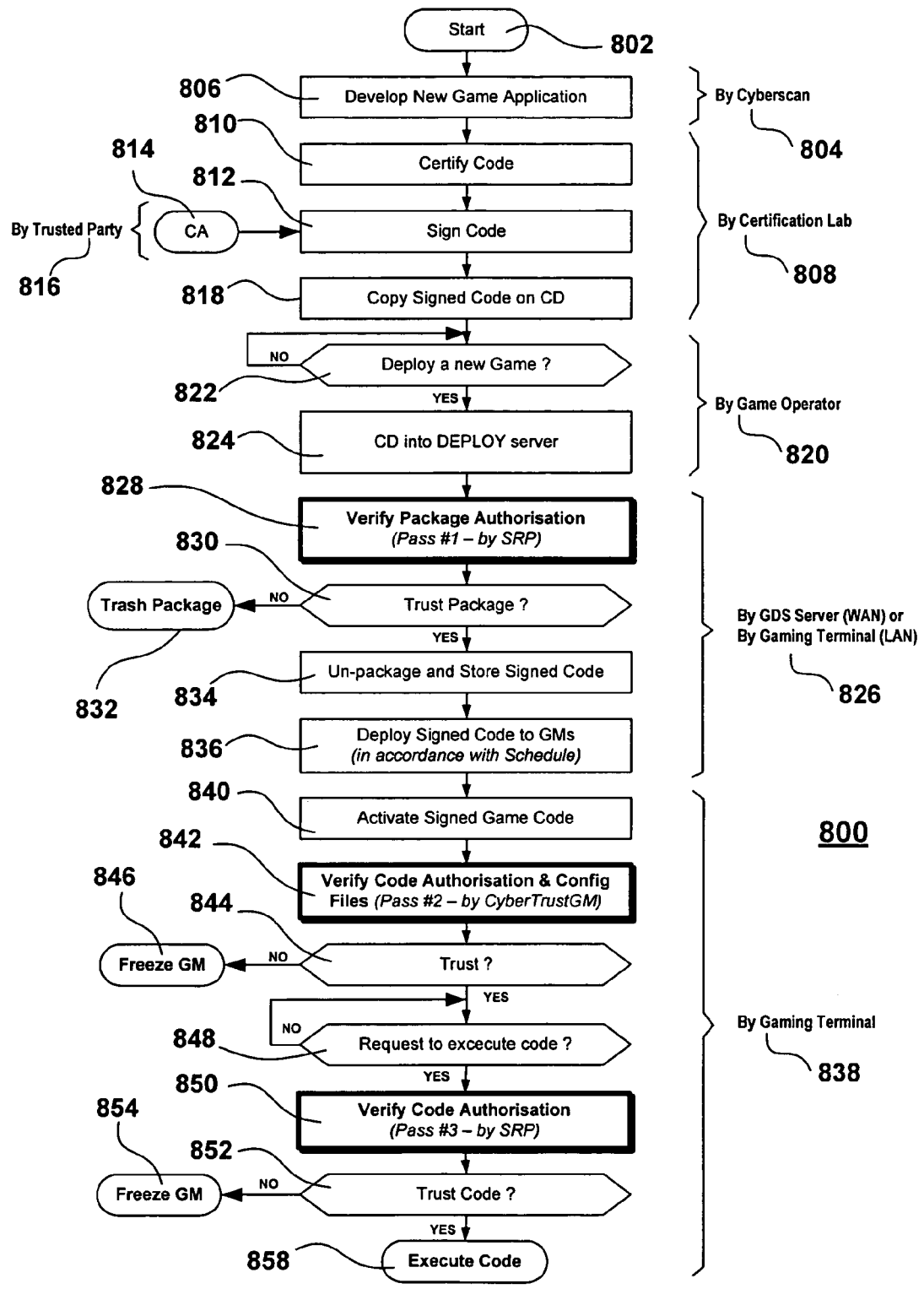
FIG. 8 illustrates an exemplary cycle from the moment a game is being created until it is first executed on a gaming terminal, according to an embodiment of the present invention.

Reference numeral 800 in FIG. 8 illustrates an exemplary cycle from the moment a game is being created until it is first executed on a gaming terminal, according to an embodiment of the present invention. The flowchart 800 starts at 802 when the decision to initiate a project to develop and release a new game is made. The game developer (Cyberscan here, for illustrative purposes only) 804 develops a new game application 806 whose code must be certified at 810 by a recognized certification lab 808. The certified code must then be signed as shown at 812 using PKI certificates produced by a certificate issuing authority (CA) 814 controlled by a trusted party 816. The trusted party 816 may be the certification lab 808. The signed executable software components may be packaged in code-signed MSI installation packages signed in a manner substantially identical to the executable software components, that is, with a unique PKI certificate whose subject name contains part number, version and friendly name identifiers for the MSI package. The MSI packages together with scripts may then be copied to a removable media, such as a CD-ROM 818 for example.

Figure 22:
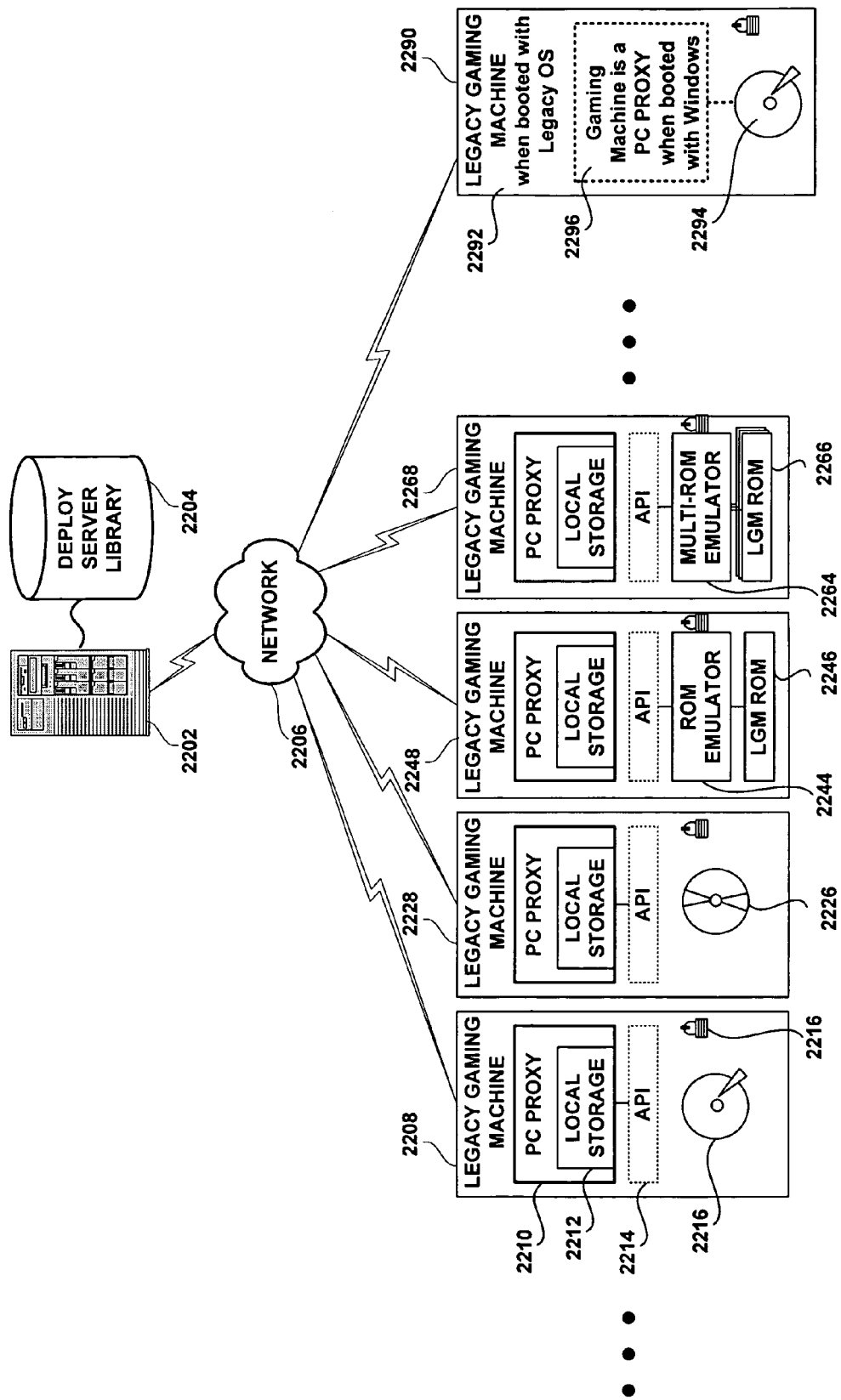
FIG. 22 illustrates aspects of another embodiment of the present invention in which secure game download and dynamic configuration capabilities are provided to legacy gaming machines.

The game operator 820 receives the CD-ROM and when it decides to deploy the new game 822, it copies the packages and associated scripts from the removable media into a library repository on a server 824 (the DEPLOY server in this case, also shown at 2202 in FIG. 22). The scripts contain automation tasks such as copying to the repository and configuring the policies.

In the case of gaming terminals connected in a LAN, each gaming terminal 826 is controlled by the policies as soon as they are enforced. The. Software Installation Policies (SIPs) controlling the installation of the new game automatically execute the MSI installation packages upon policy enforcement, provided the corresponding Software Restriction Policies have been configured to authorize the execution of the MSI installation packages. This process is performed at 828, 830. If no SRP authorizes the execution of the MSI installation packages, the installation is ignored, as shown at 832. When the MSI installation package is authorized to execute, the software components and other files contained in the package may be copied to the gaming terminals, as suggested at reference numeral 834 836. Other configuration tasks may also be carried out during the Microsoft installer installation process such as, for example, setting the Windows registry, setting shortcuts and installing software patches.

Download of the game software components from the game repository to the gaming terminals may occur as soon as the associated Software Installation Policies are enforced (and the SRPs for the MSI installation package is permitted accordingly). Therefore, scheduling of the download may be achieved by simply enforcing the associated software installation policies at a given time; this may be accomplished by having an operator manually enforcing the SIP at a predetermined time via the group policy management console, or having a process automatically enforcing the SIP at a predetermined time via the API to the group policy management console. Enforcing a policy may be achieved by linking the selected policy to the selected policy object in the domain controller active directory.

Game activation 840 that authorizes execution of the game may be achieved by enforcing the associated Software Restriction Policies. In the same manner, scheduled game activation and deactivation in order to offer selected authorized games to the players at predetermined authorized times may be achieved by simply enforcing the associated Software Restriction Policies at a given time; this may be accomplished by having an operator manually enforce the SRP at a predetermined time via the group policy management console, or having a process automatically enforce the SRP at a predetermined time via the API to the group policy management console. Enforcing a policy may be achieved by linking the selected policy to the selected policy object in the domain controller active directory. Alternatively, a selected executable software component may be prevented from executing by configuring its associated SRP security level to "disallowed".

Figure 9:
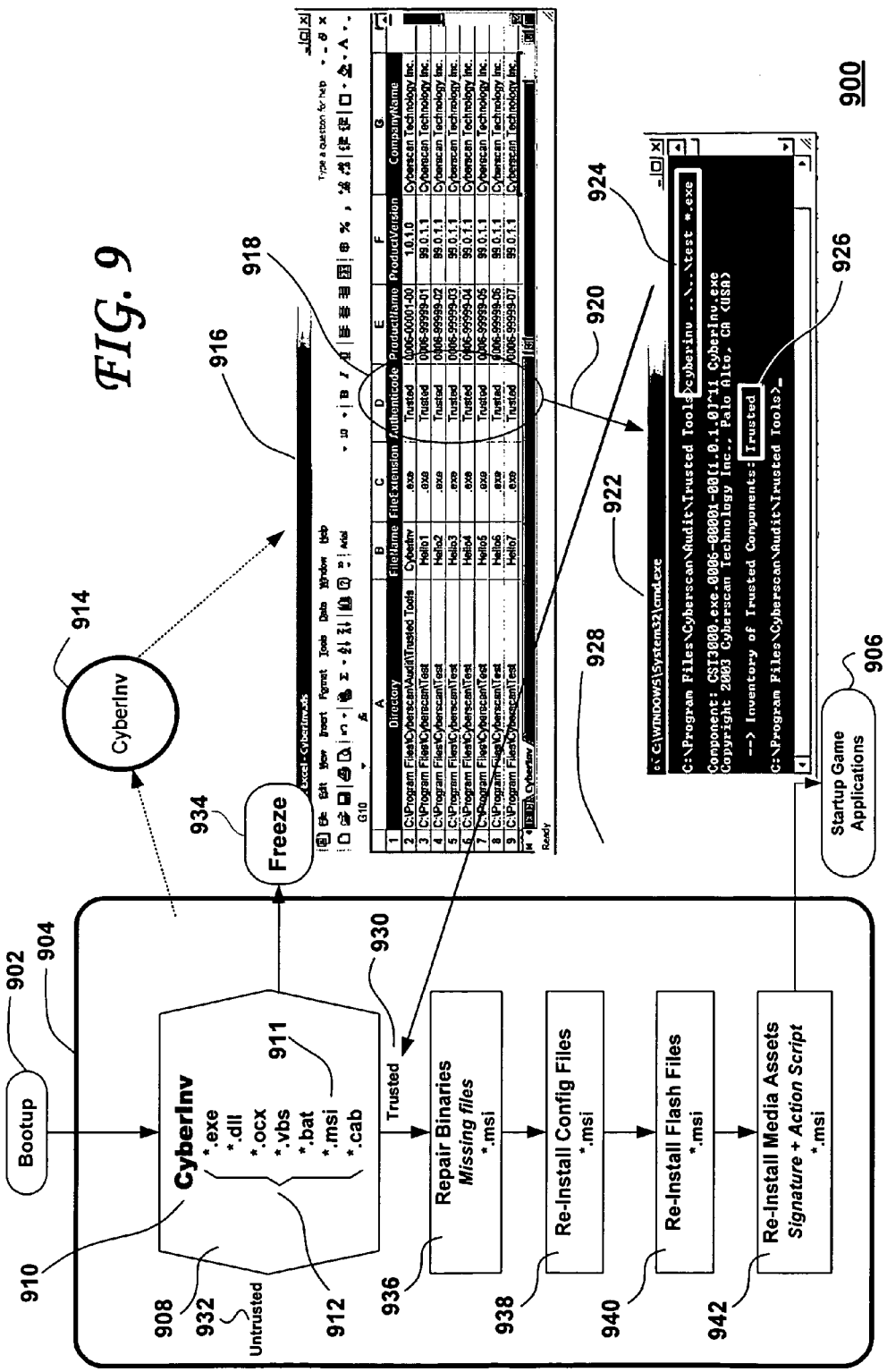
FIG. 9 illustrates the global verification process performed by the terminal in order to check that no unauthorized file may execute or may affect game outcome, according to an embodiment of the present invention.

At this stage, a global verification process 842, 844 as described relative to FIG. 9 may advantageously be executed to verify the trust of every software component installed on the gaming terminal. Should the global verification fail, the gaming terminal may be locked at 846 pending servicing by an attendant.

When a player selects a game from a gaming terminal 838 from a selection menu and requests execution thereof, as shown at 848, the authenticodes of the game's executable software components are verified by the associated enforced Software Restriction Policy as shown at 850 before beginning execution 858. Should the authenticode verification fail at 852, the gaming terminal may be locked at 854 pending servicing by an attendant. If the code is trusted, as verified by the associated enforced SRP, the game is allowed to execute, as shown at 858.

Policy changes are automatically distributed by the Windows server operating system throughout the network connected gaming system at periodic intervals; this automatic process may be disabled if required. Alternatively, the RegisterGPNotification function may be used by the game application software executing on each gaming terminal to check if an applicable group policy has changed. The gaming terminal may then decide on enforcing the policies locally immediately. The gpupdate.exe service, the RefreshPolicy function or the RefreshPolicyEx function may be used by the game application software executing on each gaming terminal to enforce the configured policies. A reboot may optionally be performed in order to recheck the gaming terminal trusted base and ensure the policies have been completely enforced (long game installation for example).

The RegisterGPNotification function enables an application to receive notification when there is a change in policy. When a policy change occurs, the specified event object is set to the signaled state. Further information on the RegisterGPNotification function may be found at: http://msdn.microsoft.com/library/default.asp?url=/library/en-us/policy/policy/registergpnotification.asp. The RefreshPolicy function causes policy to be applied immediately on the client computer. Further information on the RefreshPolicy function may be found at: http://msdn.microsoft.com/library/default.asp?url=/library/en-us/policy/policy/refreshpolicy.asp. The RefreshPolicyEx function causes policy to be applied immediately. on the computer. The extended function allows specifying the type of policy refresh to apply to be specified.

Further information on the RefreshPolicyEx may be found at http://msdn.microsoft.com/library/default.asp?url=/library/en-us/policy/policy/refreshpolicyex.asp.

The menu of authorized games offered to the player may be dynamically generated by each terminal without requiring the central system to dispatch the list of authorized games or having each terminal fetch the list of authorized games from the central system; this may be done by having each terminal check the policies enforced on the games. This may be accomplished by having a process in each terminal attempt to execute each of the entry point for each game (the parent module which is first called upon selecting a game to play). If the execution succeeds, then the game is authorized and may be added to the games menu offered to the player. If the execution is denied (SRP is unlinked or the security level is disallowed), then the game is not authorized and it is removed from the games menu offered to the player. Similarly, if a game entry software component file is not found, then the software is not installed or has been removed and is removed from the games menu offered to the player. The process of dynamically generating the game selection menu may be optimized in many ways in order to reduce the game time to start overhead to check if it is authorized.

In a casino, although new games may be scheduled to be downloaded to gaming terminals and activated at predetermined times, it is a requirement that games may not be changed while a player is playing. In practical terms, a player is considered to have terminated his or her game play when the player's credit balance remains at zero for a predetermined period of time. The predetermined period time is sufficient for allowing the player to enter a new bill or other form of credit instrument to continue playing. Therefore, the game application software on each game terminal may, according to embodiments of the present invention, continually test for this condition (credit=0 for a predetermined time) before checking for change in policy, enforcing the policy changes and then updating the menu of games to be made available to the next player.

FIG. 9 at 900 illustrates the global verification process performed by a terminal to check that no unauthorized files are allowed to execute or affect the game outcome. This process may be performed by any of the subsystems connected in the gaming systems.

The process may start with a computer cold or hot reboot 902 such that the operating system trusted base may be thoroughly verified before the game software components are verified. The trusted base is detailed in commonly assigned and copending application Ser. No. 10/520,831, filed Jan. 5, 2005, and also in Microsoft Next Generation Secure Computing Base (NGSCB), which document is hereby incorporated herein by reference in its entirety. Details of Microsoft's NGSCB are located at www.microsoft.com/ngscb. During the trusted base verification, the integrity of the Driver Signing framework, the Windows File Protection framework and Software Restriction Policies framework are verified. With NGSCB operating system such as forthcoming "Longhorn", a framework called Nexus deeply integrated directly within the hardware components (in each major chipsets) and the BIOS which constitutes a mechanism for authenticating the trustworthiness of the software and hardware configuration, is booted prior to checking the integrity of the Driver Signing framework, the Windows File Protection framework and Software Restriction Policies framework.

On completion of the operating system boot-up 902 or at another time, the global verification process 904 may be executed. The CyberInv process 910, 914 is also shown and described at FIG. 5. The CyberInv process 910, 914 verifies all the executable files in given folder trees such as 912 (*.exe, *.dll, *.ocx, *.vbs, *.bat, *.msi, *.cab, for example) for trustworthiness. If any file is found to be untrusted as shown at 932, then the gaming terminal may be frozen as shown at 934 pending examination by security personnel. A spreadsheet file 916 may be produced that list the verification status of each executable file. If the authenticode of all the files is trusted as shown at 918 then the CyberInv process 908, 910, 914, 924 returns at 920 a trusted status, as shown at 926 930. Consequently, all of the executable software components may be considered to be trusted, as shown at 930.

However, it is to be noted that the fact that an executable software component is trusted does not imply that the software component is authorized to execute; it merely indicates that the software executable software component has a valid authorized authenticode certificate and that the software component binary data is not corrupted. Checking whether an executable software component having a valid authorized authenticode certificate is authorized to execute requires that the applicable Software Restriction Policy be checked. This may be performed automatically when the software component is loaded by the operating system to start its execution, either when dynamically building the menu of authorized games, or each time upon starting execution of the game when the player has selected a game to play—or using an appropriate service that may be called by an application.

Although RM (Rights Management) and DRM (Digital Rights Management) technology from Microsoft is readily available for authenticating the trustworthiness of non-executable files such as media files, Word files and emails, for example, it adds management complexity on top of the Software Restriction Policy framework when used in a network-connected gaming system. Addressing this, embodiments of the present invention offer a method for a network connected gaming system to trust non-executable files such as initialization or configuration files, video files, sound files, multimedia files, file containing list of hashes, CRCs, and/or signatures. The present method relies on packaging the non-executable files in a MSI installation package, the MSI package being subsequently code-signed with a unique certificate and the appropriate Software Restriction Policy is configured to enable installation (execution in fact) of this MSI package. Executable files and non-executable files may be packaged together for convenience. The selected aggregate of executable files and non-executable receives at least a part number (and preferably a version number as well) that is used in the subject name of the associated certificate. Consequently, according to embodiments of the present invention, when the MSI package is installed, the installed non-executable files are obtained from a trusted and authorized source.

As the CyberInv process 908 has authenticated the trustworthiness of all the *.msi files 911, therefore whenever there is a need to ensure that the non-executable files are trusted, the associated MSI package is re-installed. It is to be noted that the service that performs the installation of the MSI packages (msiexec.exe in the current versions of Windows) may be executed with a variety of execution modifiers, such as shown at http://www.microsoft.com/tech-net/treeview/default.asp?url=/technet/prodtechnol/winxppro/proddocs/msiexec.asp. Of particular interest is the c option that reinstalls a file if it is missing or if the stored checksum of the installed file does not match the new file's value (the log file will contain the anomalies detected for subsequent forensic analysis), as shown at 936. In the global verification process 904, the c option of the msiexec.exe command may be used for re-installing every package containing configuration files 938

(such as initialization or configuration files, files containing list of hashes, CRCs, and/or signatures), Flash files 940 (Macromedia Flash and Director), and other media assets files 942 in order to ensure the trustworthiness of these files.

Subsequent to completion of process 908, all the MSI packages for the executable software components may be re-installed with for example, the msiexec.exe command using the p option in order to re-install missing authorized executable software components (the log file will contain the anomalies detected for subsequent forensic analysis).

Subsequent to the successful completion of the global verification process 904, the trustworthiness of the game application framework is established and may be started, as shown at 906.

It is to be noted that when a player wins an amount equal to or greater than $25,000 or $50,000 in a casino, there is a requirement to check the integrity of the gaming application. With legacy gaming terminals, the gaming terminal is powered-down and the ROMs are extracted in order to be verified in a trusted verifier named a "Kobetron." The Kobetron produces a signature for each of the ROMs that is compared with the corresponding signature produced by the certification lab. In this manner, the integrity of the all the software components of the legacy gaming terminal, including the operating system, the game application and the configuration data may be verified. According to embodiments of the invention, when executing the global verification process 904 subsequent to the gaming terminal bootup at 902, a verification equivalent to a "Kobetron verification" may be performed. This metaphor helps greatly in the acceptability of downloadable game technology by game regulators who are reluctant to accept state-of-the-art operating systems, multimedia and network technologies.

Figure 10:
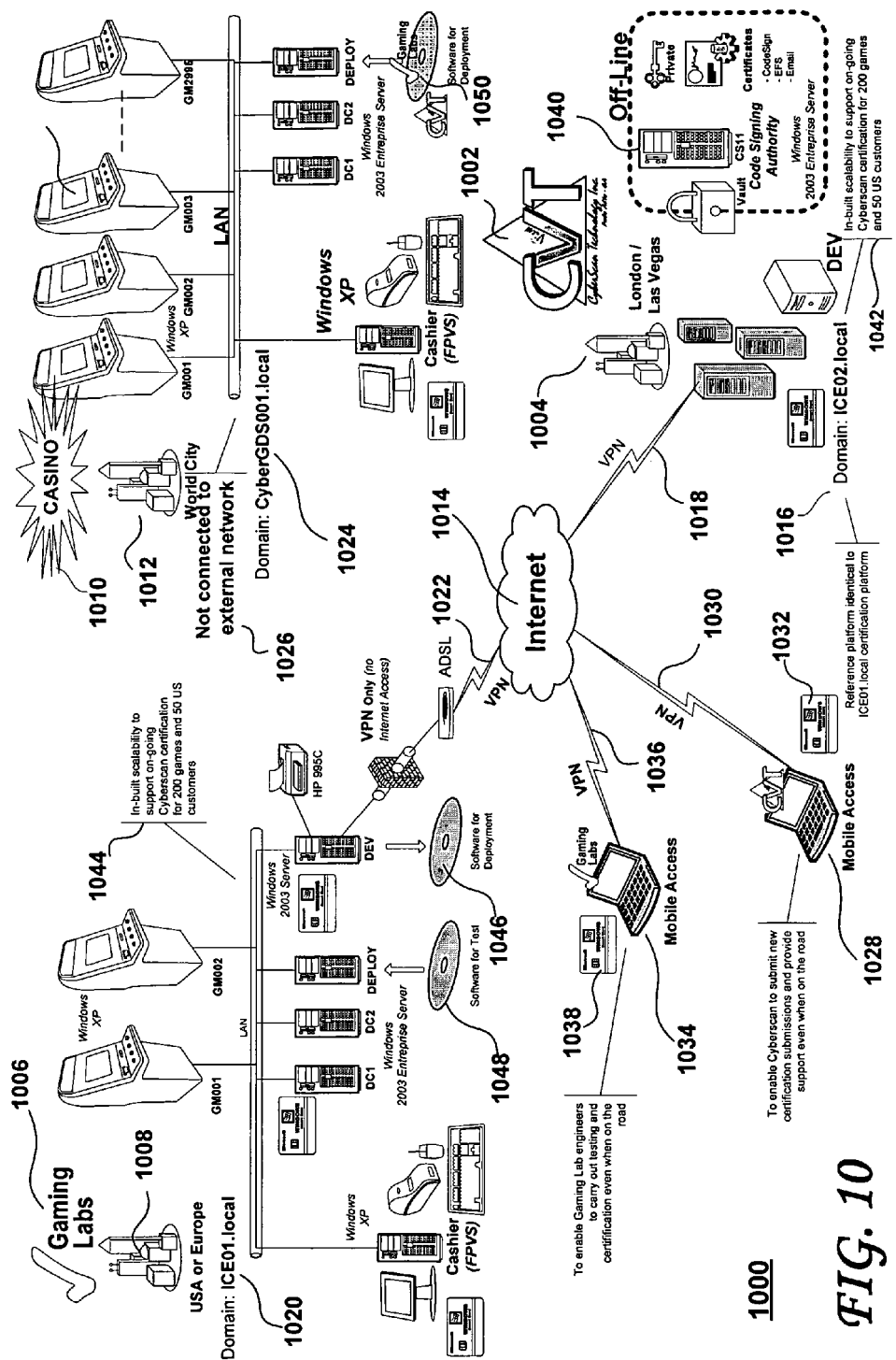
FIG. 10 illustrates the configuration of the three parties involved in a new game cycle detailed at FIG. 8, according to an embodiment of the present invention.

FIG. 10 at 1000 illustrates the configuration of the three parties involved in a new game cycle detailed at FIG. 8, according to an embodiment of the present invention. The three parties involved in a game cycle, according to embodiments of the present invention, are the game developer 1002 whose facilities are located in a given city 1004, the certification laboratory 1006 whose facilities are located in a given city 1008 and the gaming operator 1010 located in a given city 1012. The game developer 1002 and the certification lab 1006 may have a network 1020 of connected gaming system(s) representative of the network connected gaming system in place at the location (e.g., the casino) of the gaming operator 1010. In addition, the game developer 1010 and the certification lab 1006 each may have an integrated software development environment for compiling the game applications source code, each capable of managing at least 200 games for 50 distinct game operators as shown at 1044, (resulting in thousands of source code variants due to local regulation variances). The development environments may be kept synchronized via the secure network link 1016, 1018, 1014, 1022, 1020. A certification authority (CA) 1040 may be located at the game developer's site or may be controlled by an authorized trusted party such as VeriSign. The game developer site and the certification lab site may be accessible from the outside by authorized mobile users 1034, 1028 via secure links 1022, 1018, 1030, 1036. Logon authentication may be carried out using, for example, smartcards as shown at 1038, 1032 or by other secure means.

The game developer 1002 supplies the certification lab 1006 with a CD-ROM (or other media) containing the software components to be tested, as shown at 1048. The certification lab then certifies the software components supplied on the CD-ROM and provides the game developer 1002 with a CD-ROM containing the certified software components for deployment, as shown at 1046. The CD-ROM 1046 containing the authorized software components that were tested and certified by the certification lab 1006 may then be provided to the game operator (e.g., the casino) for installation and deployment on one or more of the gaming machines GM001, GM002, GM2995 coupled to the network 1024. The certified authorized software components are code-signed using a certificate produced in accordance with an embodiment of the present invention, as described hereinabove. The network 1024 is preferably not coupled to any external network, as suggested at 1026.

Figure 11:
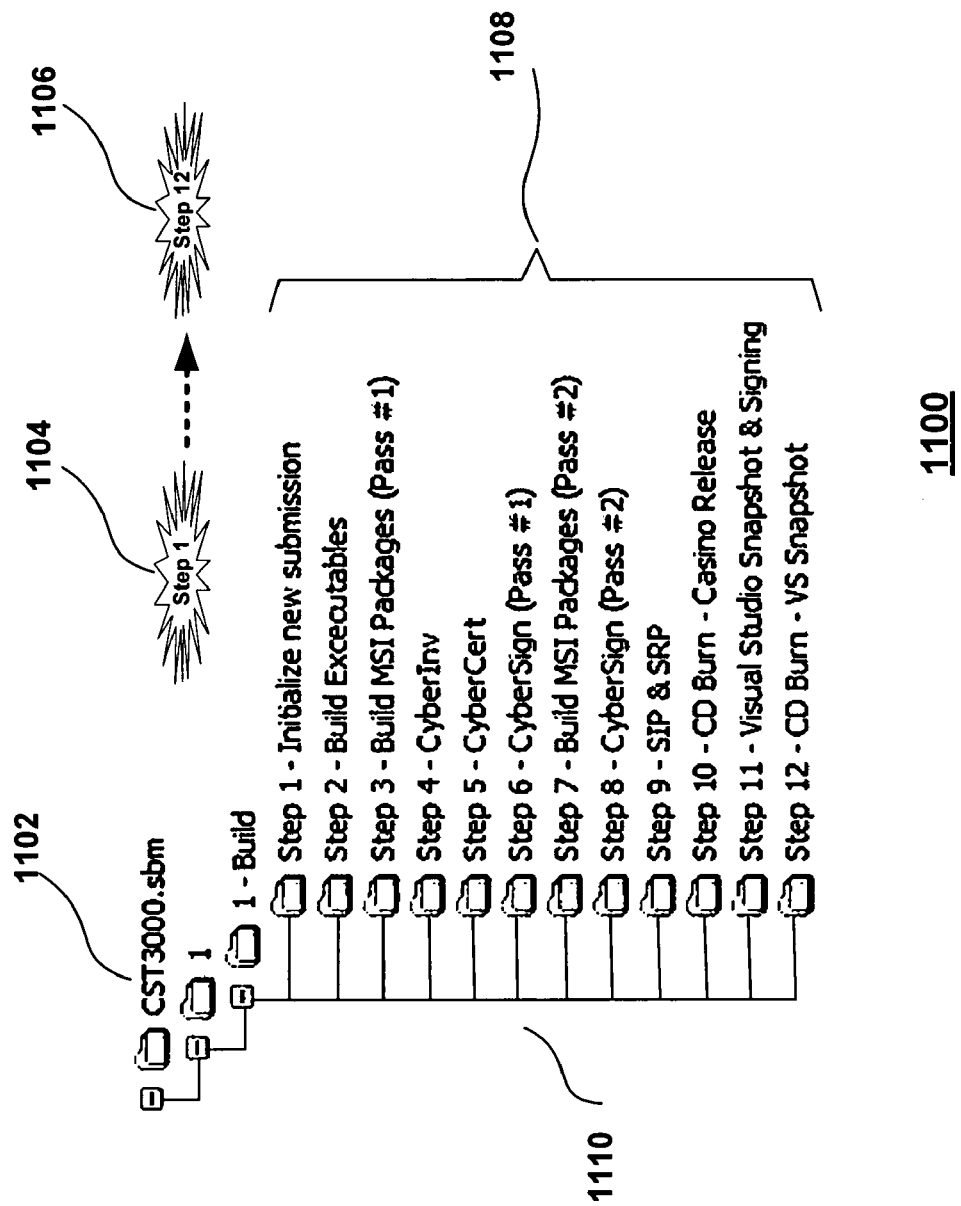
FIG. 11 illustrates the 12 folders created on the disk repository of the development environment, according to an embodiment of the present invention.

FIG. 11 shows a 12-Step Integrated Certification Environment Process, according to an embodiment of the present invention. Shown at 1100 are the 12 folders 1110 created on the disk repository 1102 of the development environment. The 12 folders 1110 are mapped to the 12-step procedure 1104 to 1106 involved in producing the CD-ROM. 1050 containing the certified authorized software components. Each folder contains the computer resources and instructions to carry out each step. The folders are clearly named with the step number and the title description of the procedure step at 1108.

Figure 12:
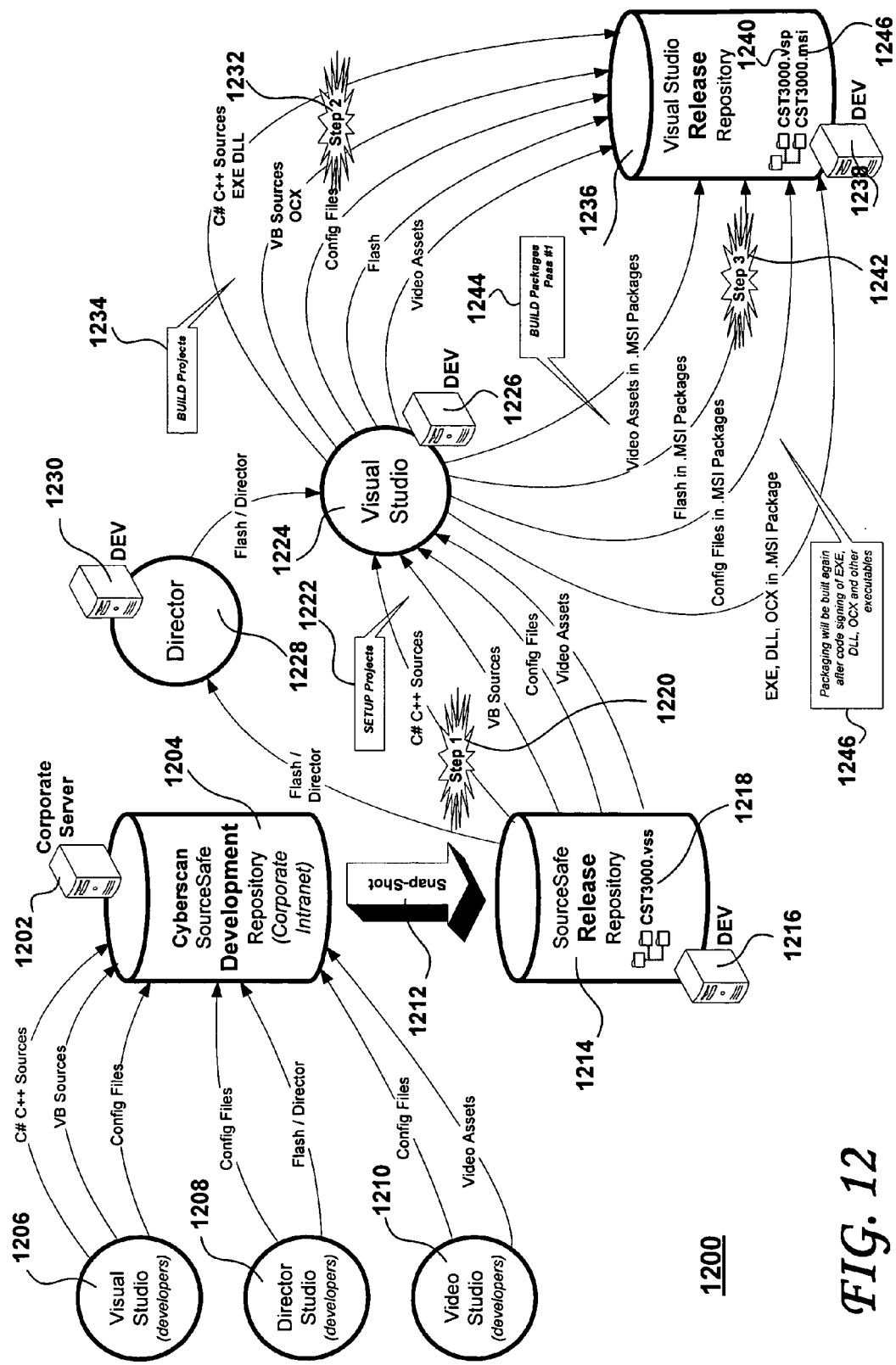
FIG. 12 illustrates the dataflow for step 1 to step 3 for producing the certified authorized software components, according to an embodiment of the present invention.

FIG. 12 shows a dataflow diagram of Step #1 to Step #3 of the Integrated Certification Environment Processor for producing certified authorized software components, according to an embodiment of the present invention. Step 1 at 1220 may include obtaining a snapshot 1212 of the repository 1204 containing the game developer's source code 1206, data files 1208 and media assets 1210 in order to configure the building environment of the reference platform with all the source code, data files, media asset files and resources files required to initiate the certification process. The snapshoot files 1212 may be stored in a repository 1218 controlled by a version configuration and control system (SCCS) such as Microsoft Visual Source Safe 1214 (VSS) on the DEV development computer 1216. The files may be grouped in project directories as "Projects" such that the source files, control files and resource files are stored in convenient systematic fashion in the Visual Studio repository 1240 on the development computer 1238. An inventory of the files submitted for certification may be produced. Step 1 may be qualified as "SETUP Projects" 1222.

Step 2 at 1232 may include compiling the source code and producing binary executable code. Microsoft Visual Studio 1224 is constructed so as to manage source code as projects (a project can be a given game) regrouping all of the dependent source code, and data files. Step 2 is also referenced as building the projects or "BUILD Projects", as shown at 1234. Media assets may require a different compiling environment on the DEV computer 1230 such as the Macromedia Director 1228.

Step 3, shown at 1242 may include producing the projects MSI packages 1244 for the source code compiled in Step 2. Relevant non-executable file such as configuration files and media assets may be packaged in MSI packages with the compiled source code. It is to be noted 1246 that packages will be built again (step 8 hereafter) after code signing of EXE, DLL, OCX and other executables (step 6 hereafter). Step 3 may be referenced as "BUILD Packages Pass #1" 1244.

Figure 13:
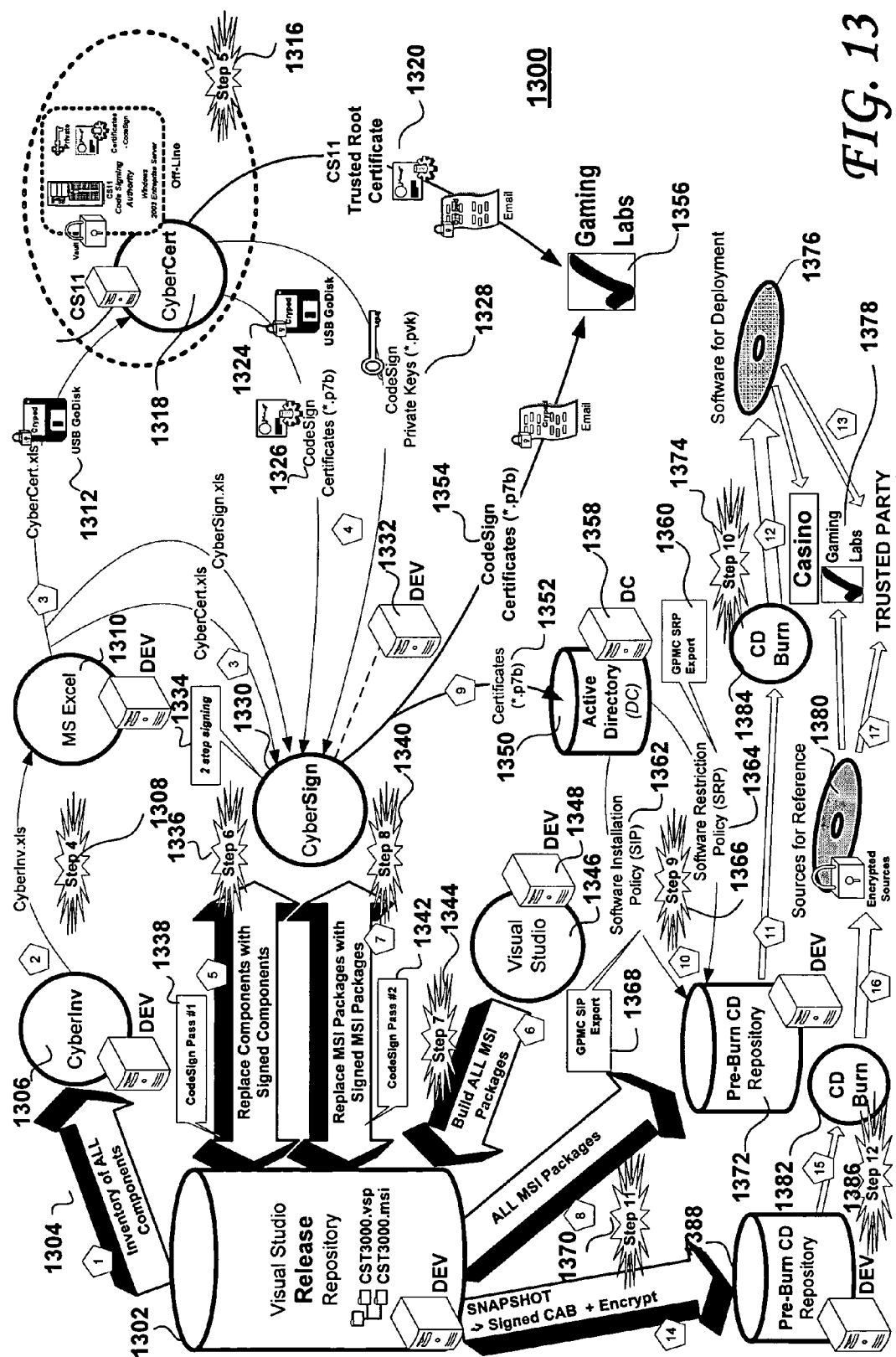
FIG. 13 illustrates the dataflow for step 4 to step 12 for producing the certified authorized software components, according to an embodiment of the present invention.

FIG. 13 shows, at 1300, the dataflow for step 4 to step 12 for producing the certified authorized software components, according to an embodiment of the present invention. Step 4 at 1308 calls for the CyberInv.exe process 1306, for a selected project (a Visual Studio project may typically regroup all the software components for an entire game), perform an inventory 1304 of the compiled software components produced by Visual Studio 1302 on completion of the Build Project process 1234 (FIG. 12) as well as the MSI install packages produced by the Build MSI Packages Pass #1 1244 process (FIG. 12). The CyberInv.exe 1306 process may also include any other executable software components not directly managed under Visual Studio such as, for example, ocx, *.vbs, *.bat, *.cab, *js. (In fact, any executable component that is supported by the Software Restriction Policy technology).

The CyberInv.exe process 1306 produces the CyberInv.xls 1307 Excel spreadsheet file 916 shown at FIG. 9, which is examined by an authorized user in the MS Excel program 1310. The CyberInv.xls 1307 file is copied to the folder "Step 4—CyberInv" folder in 1110 in FIG. 11. The binary files having just been compiled are not code-signed; consequently the authenticode field shows an "Untrusted" status for each of the binary components. The friendly name, file type, part number and version (including build number) are extracted directly from the assembly information contained in the source code, therefore truly reflecting the identity of the source code component.

Because the build number is incremented each time the code is recompiled in a Build operation, it is to be noted that the version number will change accordingly. The authorized user eliminates the rows that are irrelevant to the game to be certified and saves the file under the CyberCert.xls 1311 file name which contains the necessary friendly name 512, executable type 514, part number 518 and version 520 information to compose the PKI certificate subject name in accordance with method detailed at FIG. 3 for subsequent code signing. The program path location 510 of the unsigned software components is also available for later retrieval of the unsigned binary file. The CyberCert.xls 1311 file is copied to the folder "Step 5—CyberCert" folder in 1110 in FIG. 11.

The CyberCert.xls 1311 file may be securely copied in encrypted form to a removable media such as a floppy disk, a CD-ROM or a USB disk 1312, or alternatively transferred to another location by secure communication means.

The CyberCert.xls 1311 file is split into 2 files CyberSign1.xls 1317 and CyberSign2.xls 1319. CyberSign2.xls contains only the rows associated to the MSI packages and CyberSign1.xls contains the rows corresponding to the other executable file. CyberSign1.xls is copied to the "Step 6—CyberSign (Pass #1)" folder in 1110 in FIG. 11, and CyberSign2.xls is copied to the "Step 8—CyberSign (Pass #2)" folder.

Step 5 at 1316 includes having a certification authority (CA) 1315 located at the game developers' site or controlled by an authorized trusted party such as VeriSign generating certificates in accordance with the details provided in the CyberCert.xls 1311 file, that is, with a subject name created in accordance with the method detailed relative to FIG. 3. An automated process CyberCert.exe 1318 executing on the offline CA computer Windows server named CS11 1314 may automate the generation of the PKI public certificates 1326 and the associated private keys 1328 using the CyberCert.xls 1311 file.

The trusted root certificate for the authorized CA 1320 is supplied to the certification lab, the game regulators or other parties for reference and for importing as a trusted root into the ICE computer system and the gaming system certificates store.

The public certificates 1326 and their associated private keys 1328 are forwarded to the DEV computer 1332 of the ICE system in encrypted form on a removable media such as a floppy disk, a CD-ROM or a USB disk 1324, or alternatively transferred by secure communication means. Public certificates 1326 and their associated private keys 1328 that are associated with the MSI packages are copied into the "Step 6—CyberSign (Pass #1)" folder in 1110, and the other public certificates 1326 and their associated private keys 1328 that are associated with other software components are copied to the "Step 8—CyberSign (Pass #2)" folder.

Step 6 1336 includes steps of code signing the non-MSI executable components listed in the CyberSign1.xls 1317 file using the corresponding public certificates 1326 and their private keys 1328. The code signing may be performed using the SignCode.exe utility provided by Microsoft, or equivalent. A password may be required for the private key depending on the security option selected when generating the certificate at the CA. The CyberSign.exe process 1330 may automate the code-signing of all the non-MSI executable components listed in the CyberSign1.xls 1317 file using the friendly name, file type, part number and version (including build number) given in each row. The CyberSign.exe process may call the SignCode.exe utility or the equivalent API. During the code signing process, the compiled executable software components may be replaced at 1339 by their code-signed form. Step 6 is designated as "CodeSign Pass#1" 1338.

Step 7 at 1344 includes re-building all the MSI install packages 1345 performed during step 3 at 1242. This time, the MSI packages contain the non-MSI code-signed executable components.

Step 8 at 1340 includes code signing the MSI executable components listed in the CyberSign2.xls 1319 file using the corresponding public certificates 1326 and their private keys 1328. The code signing may be performed using the SignCode.exe utility provided by Microsoft, or equivalent. A password may be required for the private key depending on the security option selected when generating the certificate at the CA. The CyberSign.exe process 1330 may automate the code-signing of all the MSI executable components listed in the CyberSign2.xls 1319 file using the friendly name, file type, part number and version (including build number) given in each row. The CyberSign.exe process may call the SignCode.exe utility or the equivalent API. During the code signing process, the executable MSI software components may be replaced 1341 by their code-signed form. Step 8 is designated as "CodeSign Pass#2" at 1342. The executable MSI software components are copied as shown at 1371 to the CD Pre-Burn repository 1372.

Because of the necessity of performing step 7, the CyberSign 1330 code-signing process to be used for the ICE (Integrated Certification Environment) is designated a "2-Pass code-sign", as indicated at 1334.

Step 9 1366 includes (a) configuring the software restriction policy (SRP) 1360 for the ICE system test gaming terminals (via the active directory 1350 in the domain controller DC) with the certificate rules corresponding to the certificate produced at step 5 (the *.p7b certificate at reference numeral 1326 may be converted to *.cert certificates for compatibility reasons when configuring the SRP); (b) configuring the Software Installation Policy (SIP) 1368 for the ICE system test gaming terminals with the MSI packages produced at step 7, then (c) using the GPMC (Group Policy Management Console) or equivalent service, exporting the SIP via SIP export scripts 1362 and the SRP via SRP export scripts 1364 (the policy export facility is available in the Group Policy Management Console GPMC 702, 704). These SIP and SRP export scripts may be copied into the folder "Step 9—SIP & SRP" folder in 1110. These SIP and SRP export scripts may be later imported in the gaming operator's 1010 gaming system for enforcing the policies on the game components. SIP export scripts 1362 and SRP export scripts 1364 are stored in the CD Pre-Burn repository 1372 (or into the folder "Step 10—CD Burn—Casino Release" folder in 1110).

Step 10 at 1374 includes steps of burning at 1384 to a CD-ROM 1376 or other removable media the content of the CD Pre-burn repository 1372 comprising (a) the executable MSI software components 1371; (b) the SIP export scripts 5 1362 and SRP export scripts 1364 and (c) other automation scripts in order to automate the installation of (a) and (b). A copy of CD-ROM 1376 may be forwarded (a) to the gaming operator's 1010 gaming system for game deployment (such as a casino 1379), (b) to the certification lab 1378, and (c) a trusted party 1377 such as a lawyer or in escrow for impartial reference in case of later dispute. The CD-ROM 1376 may later be inserted at 1050 in the gaming operator's 1010 gaming system for game deployment.

Step 11 at 1370 includes steps of (a) taking a snap-shot 1387 of the entire development environment for a selected certified game (Visual Studio repository 1302 and Visual Source Safe repository 1214 1218 that contains all the source file, the compiled code-signed executable files and dependant executable files, the non-executable files, project solution, automation scripts, the source and compiled signed code from other development platforms, the media assets from media development platforms such as MacroMedia Director 1228); in (b) taking a snap-shot 1387 of the code-signed MSI installation packages; in (c) optionally encrypting them; and then in (d) copying them into a CD pre-burn repository 1388 (or into the folder "Step 12—CD Burn—VS Snapshot" folder in 1110).

Step 12 at 1386 includes steps of burning at 1382 to a CD-ROM 1380 or other removable media the content of the CD Pre-burn repository 1388 comprising the software components of step 11. A copy of CD-ROM 1380 may be forwarded to the certification lab 1378 and to a trusted party 1377 such as a lawyer or in escrow for impartial reference in case of later dispute.

Steps 4 to step 12 should be carried out each time a source code is being recompiled subsequent to a modification because a unique certificate must be associated to each build. Deviating form this order may jeopardize certificate integrity because of the risk of a human error that may result in the wrong certificate being used during the code signing process.

Figure 14:
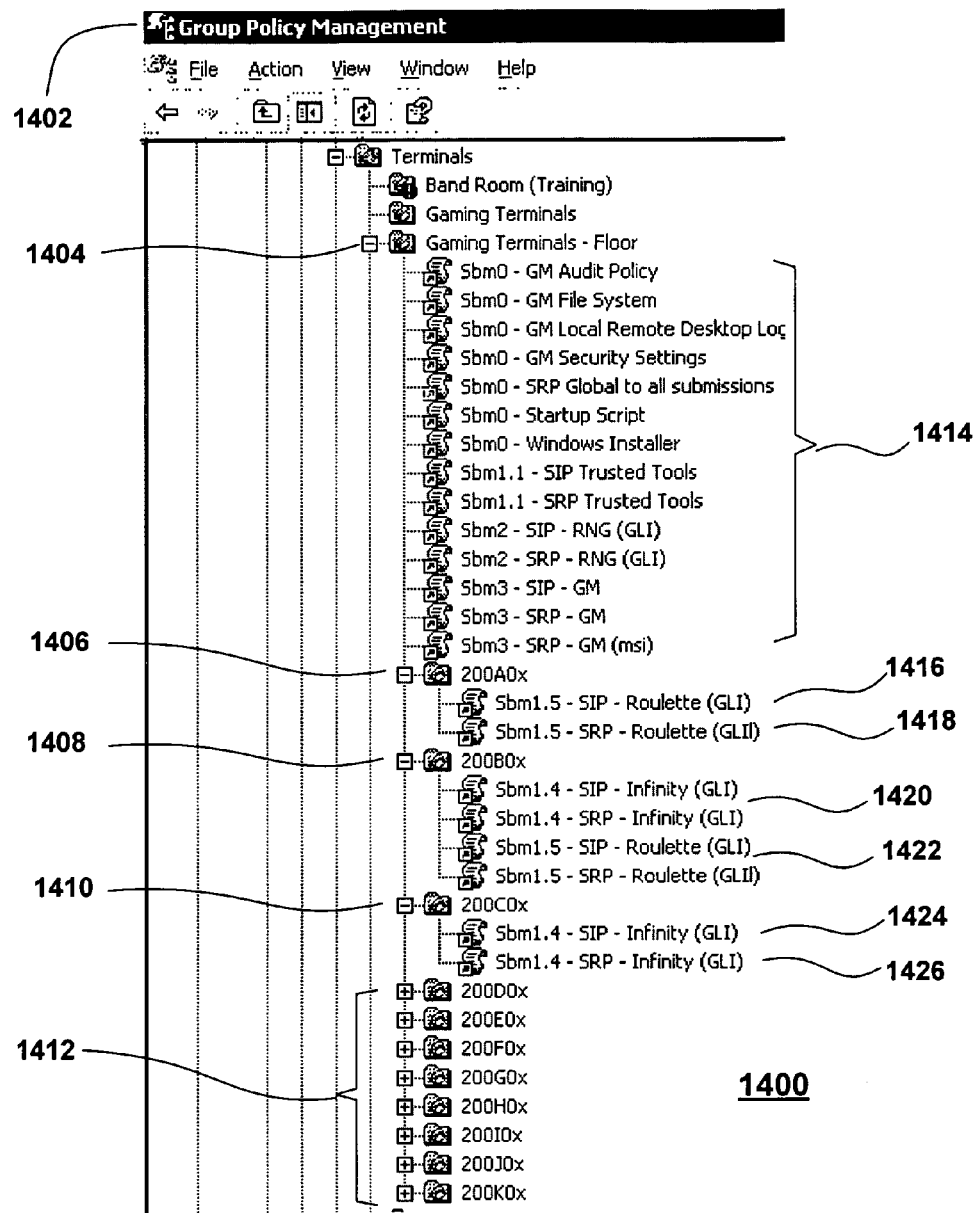
FIG. 14 illustrates the grouping of gaming terminals and the associated enforced policies, according to an embodiment of the present invention.

FIG. 14 illustrates assignment of policies by banks of gaming machines. Reference numeral 1400 in FIG. 14 shows the grouping of gaming terminal and the associated enforced policies. In this illustration, the Group Policy Management console 1402 may be configured such that the active directory Organization Unit (OU) named "Gaming Terminals—Floor" at 1404 is architectured to regroup the gaming terminals in "banks" or sub-Organization Units (sub-OUs) identified by 200A0x 1406, 200B0x 1408, 200C0x 1410, and 200D0x to 200K0x at reference numeral 1412. Each bank contains a predetermined number of gaming terminals, in multiples of 8 units, for example.

Noting the hierarchical tree composed of the OUs and sub-OUs illustrated at 1400, all the policies 1414 apply to the OU "Gaming Terminals—Floor" 1414 which contains all the sub-OUs 1406 1408 1410 and 1412. Using this technique, all the policies 1414 may apply to all the 3000 gaming terminals of a large casino. In the same manner, the policies 1416, 1418 apply to the bank 1406; the policies 1420, 1422 apply to the bank 1408; and the policies 1424, 1426 apply to the bank 1410.

In the illustration, the exemplary game named "Roulette" is assigned a policy named "Sbm1.5—SIP—Roulette (GLI)" 1416 which configures the Software Installation Policy (SIP) and a policy named "Sbm1.5—SRP—Roulette (GLI)" 1418 which configures the Software Restriction Policy (SRP) for that game.

In the same manner, the exemplary game named "Infinity" is assigned a policy named "Sbm1.4—SRP—Infinity (GLI)" 1424 which configures the Software Installation Policy (SIP) and a policy named "Sbm1.4—SRP—Infinity (GLI)" 1426 which configures the Software Restriction Policy (SRP) for that game.

The keyword "Sbm1.4", in this example, denotes the certification submission number 1.4, and the keyword "GLI" denotes the certification lab GLI (Game Laboratories International) approving the Infinity game software.

In the illustration, all of the game terminals regrouped in the bank 200A0x shown at 1406 are, therefore, configured to execute the Roulette game, all the game terminals in the bank 200B0x shown at 1408 are configured to execute the Roulette game and the Infinity game, and all the game terminals in the bank 200C0x shown at 1410 are configured to execute the Infinity game.

Figure 15:
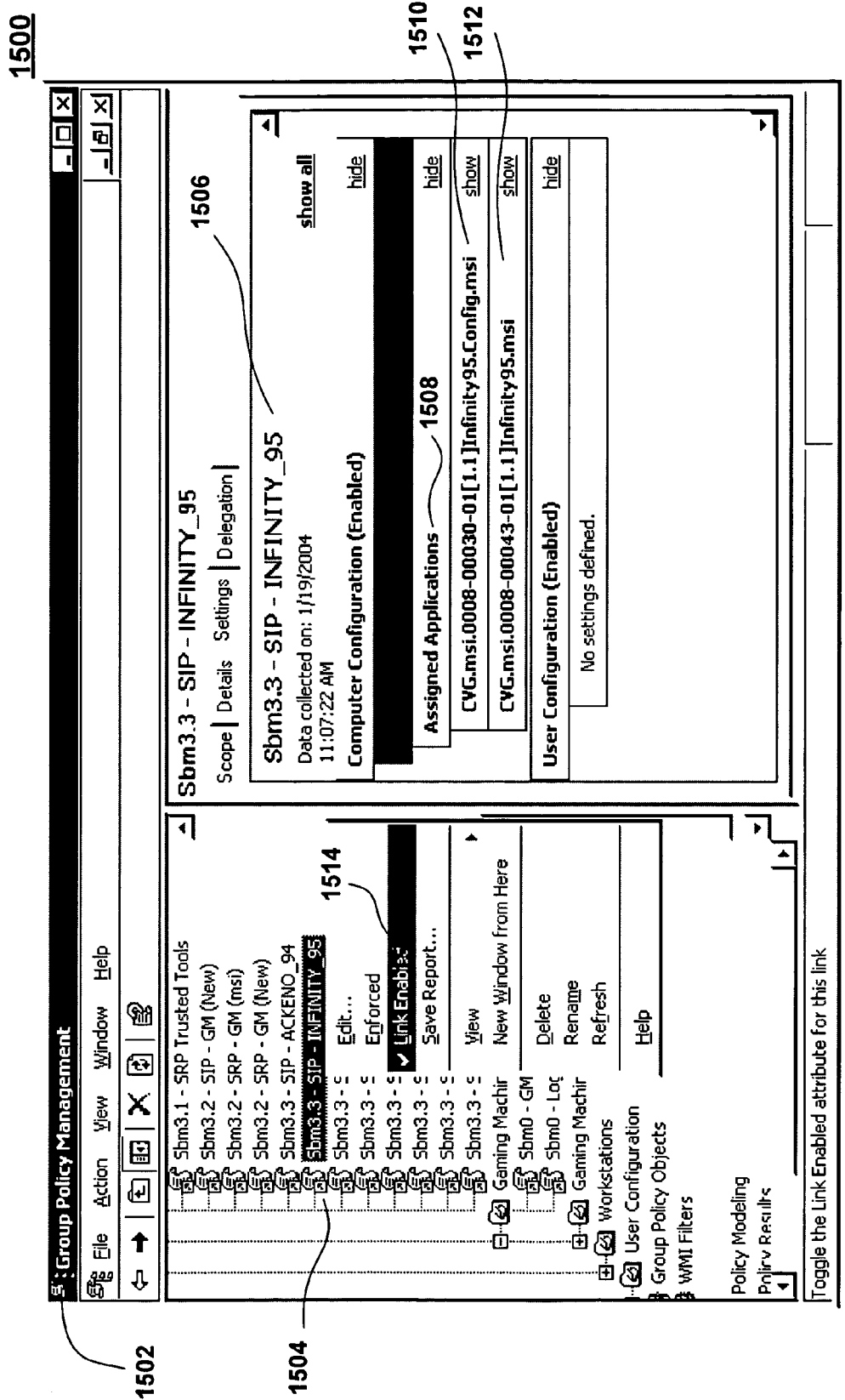
FIG. 15 illustrates a method for enforcing a Software Installation Policy by "linking" the policy, according to an embodiment of the present invention.

FIG. 15 shows the enforcement of a Software Installation Policy (SIP). In FIG. 14, banks of gaming terminals are configured to execute authorized games using SIPs and SRPs policies. However, in order for the gaming terminals to be able to install a game, the associated Software Installation Policy must be enforced. At 1500, FIG. 15 illustrates a method for enforcing a Software Installation Policy by "linking" the policy, according to an embodiment of the present invention. This is accomplished in the Group Policy Management console 1502 by, e.g., right-clicking the selected policy 1504, 1506 "Sbm3.3—SIP—INFINITY_95" associated to the Infinity game with a Return To Players (RTP) percentage of 95% and selecting the "link Enabled" attribute 1514. The software components for the Infinity_95 game contained in the two MSI installation packages 1510 and 1512 will subsequently be installed, provided the associated SRPs are configured to authorize execution of these two MSI packages (refer to description for FIG. 16). Alternatively, the same procedure may be automated via an API called from an appropriate application. It is to be noted that the linking of the policy will in fact enable the enforcement of the policy, but the policy will only be enforced on the gaming terminal when a gpupdate command or equivalent command is performed at the terminal; a terminal reboot may also be required for the policy to be enforced. Also to be noted is that policy changes are automatically distributed by the Windows server operating system throughout the network connected gaming system at periodic intervals; this automatic process may preferably be disabled such as to obtain more predictable policy enforcement changes by issuing explicit commands instead.

Package 1512 (friendly name: Infinity95.msi) contains the executable software components for the Infinity game and package 1510 (friendly name: Infinity95.Config.msi) contains the configuration files (the non-executable files) for the Infinity game. Package Infinity95.Config.msi 1510 is re-installed in the process 938.

Figure 16:
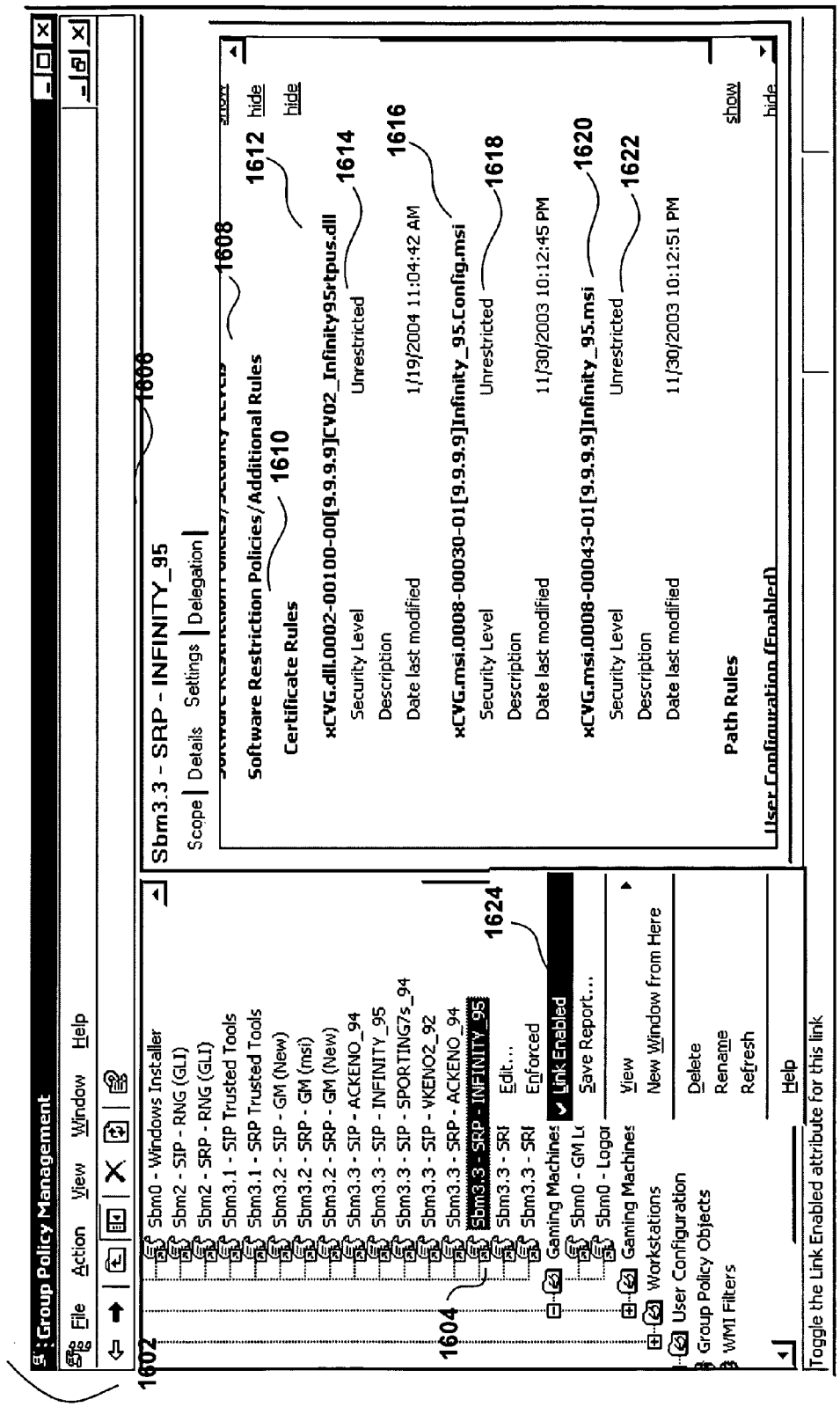
FIG. 16 illustrates a method for enforcing a Software Restriction Policy by "linking" the policy, according to an embodiment of the present invention.

FIG. 16 illustrates the enforcement of a Software Restriction Policy (SRP). In FIG. 14, banks of gaming terminals are configured to execute authorized games using SIPs and SRPs policies. However, in order for the gaming terminals to be able to execute the games, the policies must be enforced. FIG. 16 at 1600 illustrates a method for enforcing a Software Restriction Policy 1608 by "linking" the policy. This is accomplished in the Group Policy Management console 1602 by, e.g., right-clicking the selected policy 1604, 1606 "Sbm3.3—SRP—INFINITY_95" associated to the Infinity game with a Return To Players percentage (RTP) of 95% and selecting the "link Enabled" attribute 1624.

The certificate rules 1610, 1616 and 1620 that are configured with the "Unrestricted" attribute 1618, 1622 authorize the installation of the software components for the Infinity_95 game contained in the two MSI installation packages 1510 and 1512 by authorizing the unique PKI certificate associated to those MSI produced in accordance with the present method. The ".dll" executable software component 1612 is authorized, has its security level attribute set to "Unrestricted" and is, therefore, authorized to execute once it is installed.

The two MSI installation packages 1510 and 1512 for installing the software components for the Infinity_95 game have their associated unique PKI certificate 1616 and 1620 (produced in accordance with the method described herein) configured with the "Unrestricted" security level attribute 1618, 1622 via the certificate rules 1610, thus enabling (or authorizing) execution and installation of the software components for the Infinity_95 game.

The ".dll" executable software component contained in the 1512 package has its security level attribute set to "Unrestricted" thus it is authorized to execute once it is installed.

Alternatively, the same procedure may be automated via an API called from an appropriate application. It is to be noted that the linking of the policy will in fact enable the enforcement of the policy, but the policy will only be enforced on the gaming terminal when a gpupdate command or equivalent command is performed at the terminal; a terminal reboot may also be required for the policy to be enforced. Also to be noted is that policy changes are automatically distributed by the Windows server operating system throughout the network connected gaming system at periodic intervals; this automatic process may preferably be disabled such as to obtain more predictable policy enforcement changes by issuing explicit commands instead.

Figure 17:
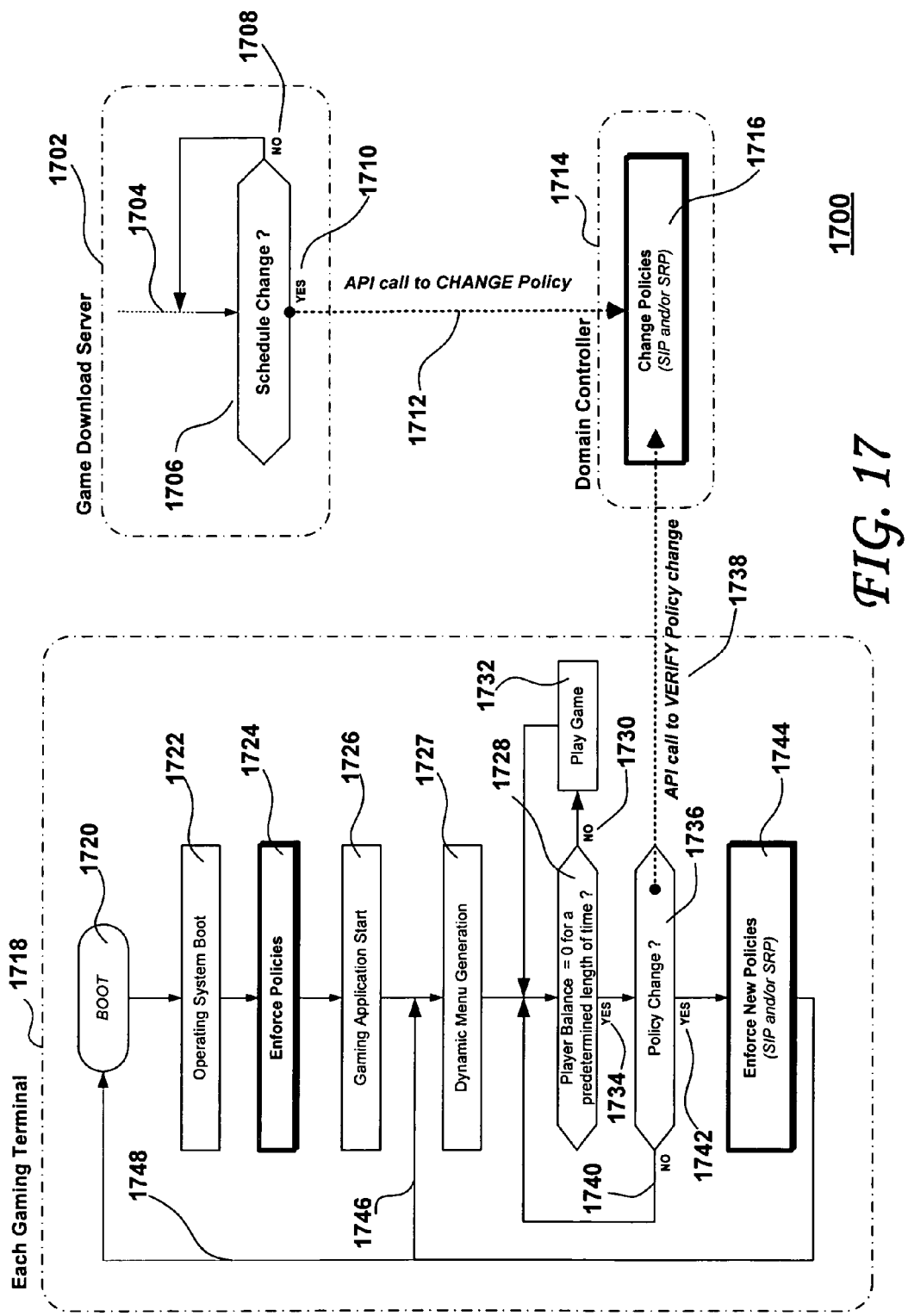
FIG. 17 illustrates the method to enforce a policy at a predetermined time, according to an embodiment of the present invention.

FIG. 17 illustrates a method at 1700 to enforce a policy at a predetermined time, according to an embodiment of the present invention.

Enabling enforcement of policies as described relative to FIG. 15 and FIG. 16 may be carried out interactively by an authorized user at predetermined authorized times, or alternatively may be controlled by a process at predetermined authorized times via the appropriate API. At the central system 1702 (the game download server in this illustration) at a given time 1704, a user or a process may verify a change 1706 in the list of games to be made available to players on a selected set of gaming terminal banks. In case of a schedule change as shown at 1710 (or other reasons such as introducing a new game or revoking an existing game), policies on the domain controller 1714 are being changed accordingly either interactively by a user in the Group Policy Management console as described for FIG. 15 and FIG. 16, or by a process via the equivalent APIs 1712. The changed policies are being enabled for enforcement at 1716 in the domain controller.

In a casino, although new games may be scheduled to be downloaded to gaming terminals and activated at predetermined times, it is a requirement that games are not to be changed while a player is playing. In practical terms, it is considered that a player terminates playing when his or her credit balance remains at zero for a predetermined period of time. The predetermined period time should be sufficient to allow the player to enter a new bill or other form of credit or payment instrument to continue playing. Therefore, the game application software on each game terminal continually tests for this condition (credit=0 for a predetermined period of time) before checking for change in policy, enforcing the policy changes and then updating the menu of games to be made available to the next player.

Upon power-up, each gaming terminal 1718 executes a boot 1720, loads its operating system 1722 and enforces the policies 1724 that are configured at the time of the start-up process. When the game application starts at 1726, it displays a menu of authorized activated games as shown at 1727 to the player using for example the dynamic method described relative to FIG. 19. Whenever the player balance is non-zero 1728, 1730, the player may play as shown at 1732 the games listed on the menu in accordance with the enforced policies. When the player's balance reaches zero at 1734 and remains zero for a predetermined period of time, it is considered that the player is no longer playing. The gaming application of the gaming terminal may then verify at 1736 if a policy has changed 1738. This may be done via the RegisterGPNotification. The RegisterGPNotification function enables an application to receive notification when there is a change in policy. When a policy change occurs, the specified event object is set to the signaled state. Additional details regarding the RegisterGPNotification function may be found at http://msdn.microsoft.com/library/default.asp?url=/library/en-us/policy/policy/registergpnotification.asp.

At 1740, if there is no change in policy, the games listed on the menu will be unchanged for the next player. If there is a change in policy at 1742, the gaming terminal may enter into a process whereby the policies are enforced as shown at 1744, using for example the gpupdate.com service, the RefreshPolicy function or the RefreshPolicyEx function, or equivalent services or API. It is to be noted that the verification of change in policy and the enforcement of the changed policies may be carried out by each terminal independently.

The RefreshPolicy function causes policy to be applied immediately on the client computer. Additional details regarding the RefreshPolicy function may be found at http://msdn.microsoft.com/library/default.asp?url=/library/en-us/policy/policy/refreshpolicy.asp The RefreshPolicyEx function causes policy to be applied immediately on the computer. The extended function allows specifying the type of policy refresh to apply. Additional details regarding the RefreshPolicyEx function may be found at http://msdn. microsoft.com/library/default.asp?url=/library/en-us/policy/policy/refreshpolicyex.asp Once the change in policy is enforced at 1744, the gaming terminal may reboot as shown at 1748 or exit and re-enter the gaming application, which would dynamically recreate the menu list of games 1727 to be made available to the next player, as detailed at FIG. 19.

A similar method relying on explicit WMI calls and administrative templates (*.adm) may be applied to obtain the same result in gaming environments whereby the domain controller active directory is not available such is the case with gaming terminals connected in WAN (Wide Area Network) whereby the network bandwidth is limited or the network availability is poor.

An alternative method relying on SMS (System Management Server) code download instead of SIPs (Software Installation Policy) for installing software components and software MSI packages may be used. However, the executable software components remains under SRP (Software Restriction Policy) in accordance with the unique PKI certificate generated for each component as described in the invention.

Figure 18:
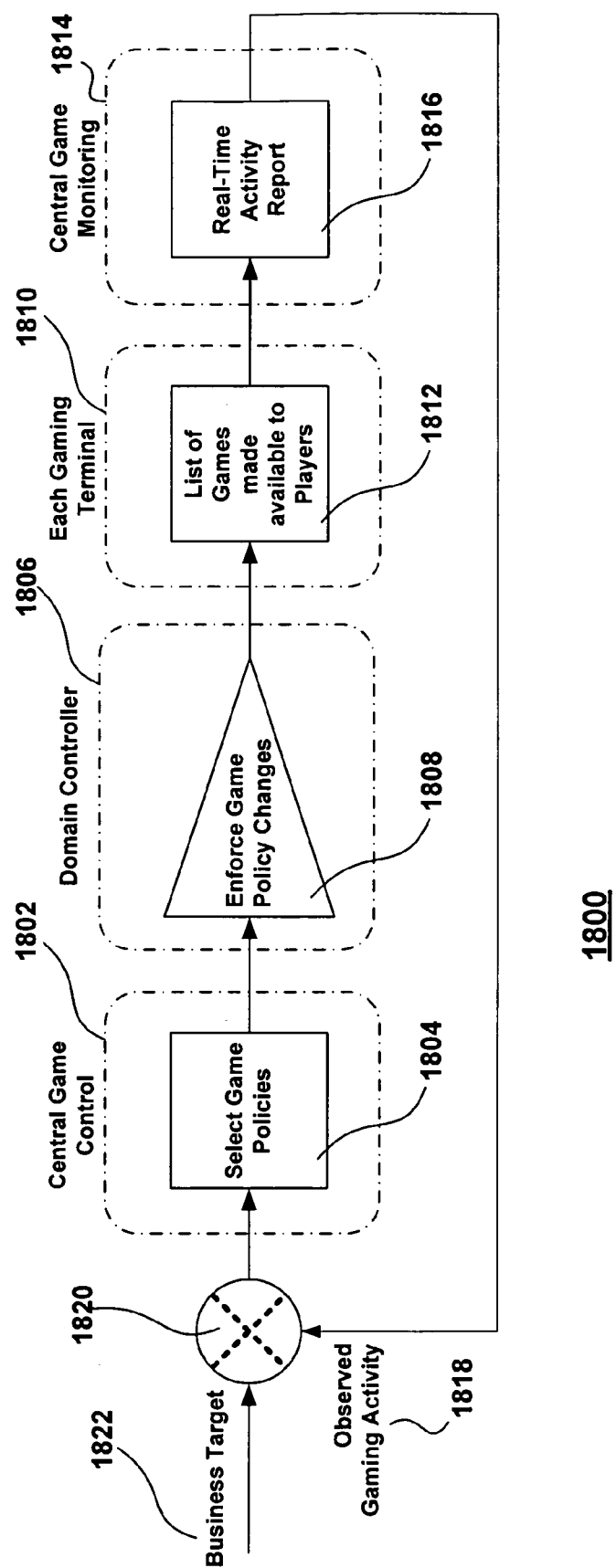
FIG. 18 illustrates the method to enforce a selected policy as the result of observing the gaming activity, according to an embodiment of the present invention.

FIG. 18 shows a close-loop enforcement of a policy, according to an embodiment of the present invention. FIG. 18 at 1800 illustrates a method to enforce a selected policy as the result of observing the gaming activity. The method is directly derived from FIG. 17 whereby the policy change 1716 takes place at 1804 and is selected from a choice of pre-configured policies, for example in a look-up manner, whereby a policy would result in making available to the players a menu of games 1812 (1727 in FIG. 17) to provoke a given gaming activity change which may be monitored in real-time at 1816. The observed activity 1818 may then be compared 1820 to predetermined businesses objectives 1822 and a correction or modification may be applied by selecting a new policy that would change the list of games available on a selected aggregate of gaming terminals 1810. For example, due to a long queue of people who want to play the Infinity game, a greater number of banks of gaming terminals may be configured to make the Infinity game available to players on these terminals. Another reason for applying a new policy might be if a particular area of the casino floor is heavily populated with players while another area is empty. Suppressing some popular games in a highly frequented area and adding them to the less frequently area may help spread the player distribution within the casino or gaming area more evenly. Yet another reason for applying a new policy could be if the gaming activity is low, then games with a higher RTP (return to player), let us say 98% instead of 95%, may be activated in some areas to boost activity.

The process may involve several subsystems as illustrated in FIG. 18: the central game control 1802 wherein policies are selected, the domain controller 1806 that enables enforcement of the policies 1808, a selection set of gaming terminals 1810 wherein each gaming terminal enforces the policies and make the selected games available to the player 1812, a central game monitoring system 1814 that produces activity reports in real time 1816.

The process shown at 1820 of comparing the observed activity 1818 and the targeted activity 1822 and then selecting a change in game policies 1804 may be carried out by the floor manager or the floor director, or alternatively by a knowledge base process. In both cases, a close-loop enforcement of policies (relying on the unique PKI certificate SRP associated to each executable authorized and certified software component) is achieved resulting in the dynamic configuration of the gaming system, either for LAN configurations (such as casino floors) or WAN configuration (such as video lottery terminals distributed across a large geographic area).

Figure 19:
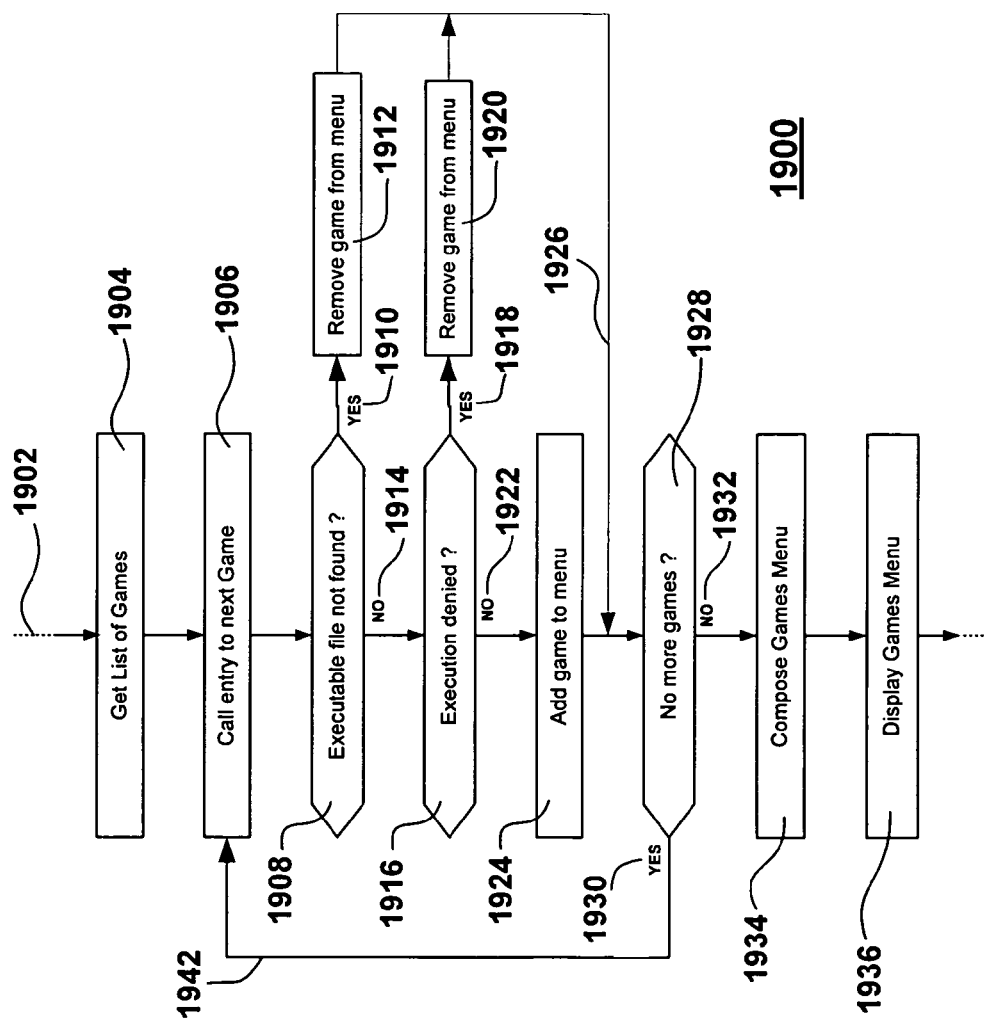
FIG. 19 illustrates the method to generate dynamically the menu list of authorized game made available to the player on each gaming terminal, according to an embodiment of the present invention.

FIG. 19 at 1900 illustrates a method to generate dynamically the menu list of authorized games made available to the player on each gaming terminal, according to an embodiment of the present invention. The dynamic configuration of a large gaming system whereby authorized games made available to players on selected group of gaming terminals using software restrictions policies at the central system may result is hundreds of different game menus. Reliance on SRPs for preventing non-authorized software components to execute is entirely based on a sound and demonstrable trusted base; therefore the gaming system is trusted. Getting the list of authorized games to each gaming terminal would require configurations files to be sent from the central system to each of the gaming terminal; however, this would be illegal because the change in the list of games may affect the game outcome. This is clearly understandable when considering changing a game; let us say Infinity_95 with a RTP or 95% with Infinity_98 with a RTP of 98% at 10:00 PM, then back at 8:00 AM, and this each day except during the weekend, or at other times as a result of the closed loop process described at FIG. 18. Game regulators mandate that the process to manage this type of change be certified with secure means of the same order as when installing/downloading software components using a unique PKI method.

Embodiments of the present invention, therefore, provide secure means to update a list of authorized games to be offered to the player. The menu of authorized games offered to the player may be dynamically generated by each terminal without requiring the central system to dispatch the list of authorized games or having each terminal fetch the list of authorized games from the central system (both are illegal without extreme precaution of the same order as the installing/downloading of software components using a unique PKI method because they may affect the game outcome); this is achieved by having each terminal checking the certificate Software Restriction Policies enforced on the games (a unique PKI certificate being generated for each of the executable game components in accordance with the methods detailed in this document).

As illustrated in FIG. 19 at 1900, each terminal when executing the gaming application 1902 gets a list of the file names for the games available at 1904 from a trusted configuration file (an updated trusted configuration file may have been downloaded in a certified code signed MSI package with the last game download) and a menu is initially compiled for this list. Attempts to execute each of the game entry module of the games contained in the list 1906 are made. If the game entry module is not found at 1910, the software components do not exist on the gaming terminal and the game is removed from the menu 1912, whereupon the process iterates to next game, as suggested at 1926 1928. If the execution of the game entry module is denied at 1916, 1918 because the Software Restriction Policy is preventing this game to execute, the game is removed from the menu as shown at 1920 and the process iterates to next game, as shown at 1926 1928. If the execution of the game entry module is successful at 1922, then the game is authorized and may be added to the games menu offered to the player. The process iterates through other games in the list, as shown at 1928, 1930, 1942, 1906, if any. Once the iteration is completed at 1932, the games menu may be composed at 1934 and the menu is displayed to the player at 1936.

Figure 20:
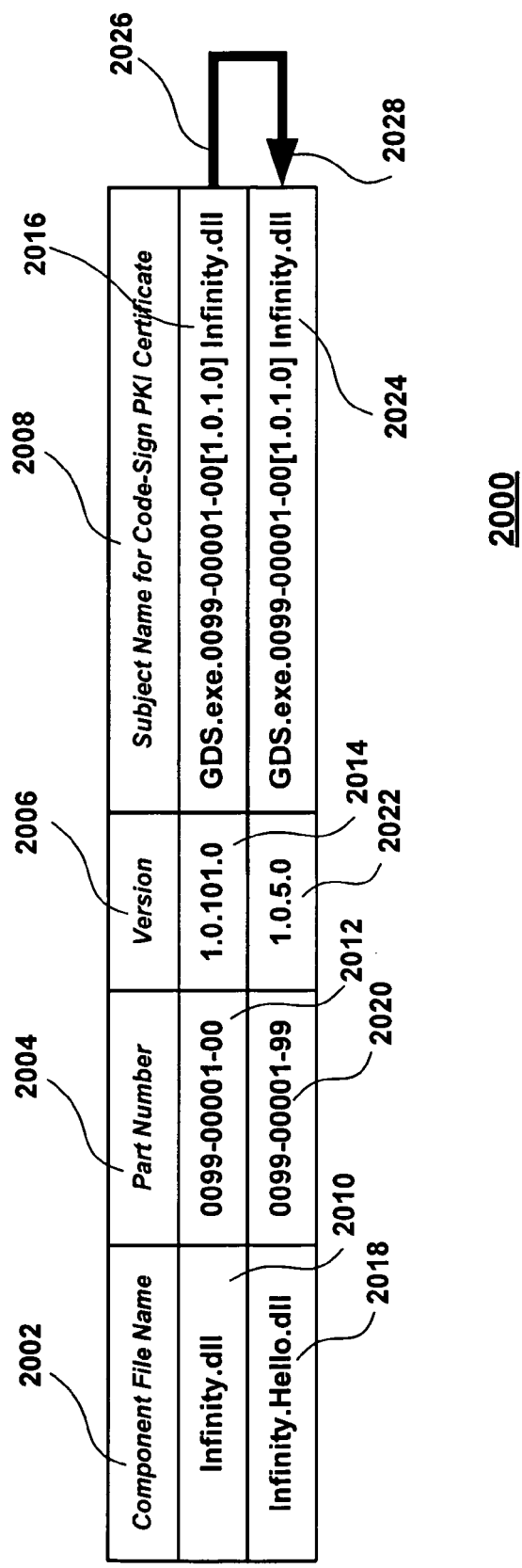
FIG. 20 illustrates the method to generate a code signed companion software component, according to an embodiment of the present invention.

FIG. 20 shows a companion Hello component, according to another aspect of the present invention. Reference numeral 2000 in FIG. 20 illustrates a method to generate a code signed companion software component. Each game comprises an aggregate of executable and non-executable software components, usually comprising files such as *.exe, *.dll, *.dat, *.xml. In general, all the software components are dependent of one component named the main program or the game entry. Starting the execution of the main game component is a lengthy process, as a large number of dependent executable components and graphics need to be verified (SRP verification) and started. Currently, there is no API available in the Windows operating system client computer for verifying the status of a Software Restriction Policy enforcement on a given software component applicable to that client computer.

Another embodiment of the present invention, therefore, provides a method to quickly verify the policy enforcement on a game without starting the entire game, in order to generate the list of available games to be made available to the player in a menu. For each game, a very short companion .dll file may be created having, for example, only one line of code <<Return "HELLO">>) which would return the exemplary "HELLO" string when called. Assuming "Infinity.dll" 2010 is the main game component file name 2002 (or friendly name), then the companion file may be named "Infinity.Hello.dll" 2018. Preferably, the companion's 2018 source code would have in its assembly information a part number 2004 as shown at 2020 and a version number 2006 as shown at 2022 that is identical to the main component 2010 part number 2012 and a version number 2014, but this is not mandatory. In addition, assuming the PKI certificate's subject name 2008 associated to the Infinity.dll is "GDS.exe.0099-0001-00 [1.0.101.0] Infinity.dll" 2016, which is used for the code signing of the Infinity.dll, we may proceed with the code signing of Infinity.Hello.dll with the same 2026, 2028 "GDS.exe.0099-0001-00[1.0.101.0] Infinity.dll" certificate, as shown at 2024.

It is to be noted that code signing two distinct software executables with the same certificate is a deviation from the method taught earlier in this document. However, the fact that the role of the companion file is very well defined, as having for example only one line of code <<Return "HELLO">>which would return the "HELLO" string when called, this does not present an issue with the regulators or the certification lab.

Figure 21:
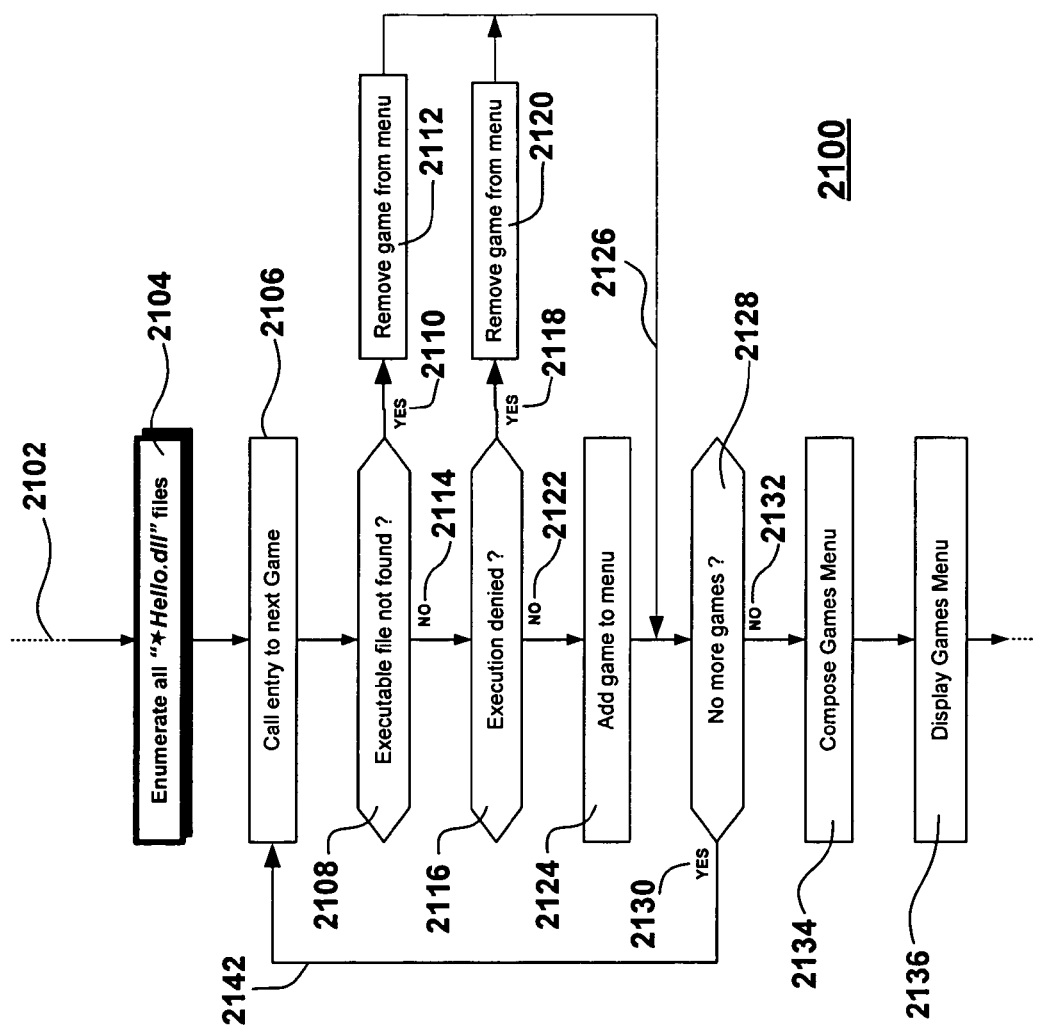
FIG. 21 illustrates the method to quickly generate dynamically the list of game installed on each gaming terminal using the companion software component, according to an embodiment of the present invention.

FIG. 21 shows steps that may be carried out to search for games on each gaming terminal, according to yet another embodiment of the present invention. Reference numeral 2100 in FIG. 21 illustrates a method to quickly generate dynamically the list of games installed on each gaming terminal using the companion software component described above. The process of dynamically generating the game selection menu may be optimized in many ways in order to reduce the overhead of starting the execution of a game to check if it is authorized. However, if the aim is to sense for the enforced SRP or SIP applied to the game or detect local availability of the game software components, then such optimizations (among other possible variations) should be considered to be within the scope of the invention as defined by the claims hereunder. According to an embodiment of the present invention, a method is presented herewith to quickly generate the list of available games to be made available to the player in a menu without transfer of a file from the server. Reference 2100 is identical to reference 1900 in FIG. 19 except for the first process 2104 whereby a file search process is performed for finding (or enumerating) file names with the "*Hello.dll" string, the "*" symbol being the standard wild character used in string searches. A list of the games installed on each gaming terminal may be quickly and dynamically generated by calling the companion software component of the game main component instead of calling the main component itself. The companion component may be as detailed at FIG. 20 or may be a similar construct.

The embodiments of the present invention described herein are also applicable to any of the subsystems available in a network connected gaming system that require preventing non-authorized software components to execute or affect game outcome, such as the gaming terminals, the game management system (CMS or MCS) that monitor and control whole or part of the estate of gaming machines, the progressive jackpot systems, the bonusing systems as well as game payment verification systems such as IGT EasyPay and Cyberview PVU (Payment Verification Unit) and PVS (Payment Verification System). Gaming subsystems are tested against gaming standards such as those produced by GLI (Game Laboratory International); the game standards are mandated by game regulators in accordance with local regulation and laws. The network-connected subsystems may be located within the premises accommodating the estate of gaming machines (connection via a LAN) or outside of the premises (connection via a WAN).

The methods described in the document rely on software installation policies and Software Restriction Policies which may be configured (a) via the domain controller active directory, as this is advantageously the case whenever the network connection is a LAN, and which may also be configured (b) to each of the local computers via WMI services (Windows Management Instrumentation) or administrative templates (.adm files) in order to configure and enforce local group policies when a domain controller is not available as this is the case whenever the network connection is a WAN. Microsoft SMS (Systems Management Server) may be used as an alternative to using software installation policies.

The methods described in the document leverage on software installation policies and/or software restriction policies technology implemented in Microsoft Windows operating system. Whenever similar technology is implemented in other operating systems such as Linux, Unix, Windows CE and QNX, it is considered as part of the invention herein.

In an other embodiment of the invention, in order to make game regulators more at ease with the huge shift in paradigm from prehensile physically secured ROM based gaming machines (whereby access to the ROM is via multiple layers of keys locks and tamper detectors), to a totally virtual or volatile fashion of downloading game code via a network, it may be advantageous to perform download of the game code when the gaming machine is not operational. Consequently, the network downloading of game code from a central repository may not interfere with the games. This may be accomplished by-terminating all gaming software in order to transform the gaming machine into a generic PC, then transferring the game software under the control of the operating system using pervasive network code download available in most information technology networked environments. An "Out-of-service" message may be displayed on the screen to indicate that the machine is no longer playable, thus is no longer a gaming machine. Once the game code is downloaded by the generic PC, the game code is verified for trustworthiness and is executed, thus transforming the generic PC back into a gaming machine.

FIG. 22 illustrates aspects of alternative embodiments of the present invention in which legacy gaming machines are provided with the full functionality of the embodiments of the present invention described above, including fully secure game download and dynamic configuration capabilities. As shown in FIG. 22, a plurality of legacy gaming machines 2208, 2228, 2248, 2268 and 2290 may be coupled to a deploy server 2202 over a network 2206. Within the context of the present invention, a legacy gaming machine may be defined to include gaming machines that are not controlled by a PC based computing device, are not configured to support the policy/enforce model described above and/or are gaming machines that do not run a recent version of the Windows® Operating System and/or are not configured to support Active Directory. Such gaming machines typically may not include a PC suitable for implementing the above-described functionality. The legacy gaming machines may include a hard disk drive, as shown at 2216, 2294 (although the ability of the drive to write to the media may have been disabled by, e.g., a jumper), an optical drive (e.g., CD-ROM) as shown at 2226, a Read Only Memory (ROM or EEPROM) as shown at 2246 or several ROMs and/or EEPROMs, as shown at 2266. Each of the ROMs 2246 and 2266 may include the executable code and/or media files for a single game or may be suitably partitioned to include the executable code and/or media files for more than one game to be made available to the player on the legacy gaming machine. Each of the legacy gaming machines 2208, 2228, 2248 and 2268 are housed in a secured, locked cabinet that conforms to local gaming regulations.

According to an embodiment of the present invention, each of the legacy gaming machines may be provided with a computing device that is configured to support the policy/enforce model described above. For example, each of the legacy gaming machines 2208, 2229, 2248 and 2268 may be provided with a computing device (such as a PC, for example) that is configured to run a recent version of the Windows® Operating System and that is configured to support Active Directory. As shown in FIG. 22, each PC 2210 may be disposed within the secured and locked enclosure of the legacy gaming machines 2208, 2228, 2248 and 2268. The PC 2210 may be a compact embedded industrial PC board, a compact PC box, or equivalent small size factor PC (e.g. handheld devices running an embedded version of Microsoft Windows such as embedded XP, Windows CE®, Windows Mobile, Windows SmartPhone, enabled to be controlled from an active directory for enforcing policies). The PC may be provided with a local password that may be (e.g., randomly) configured by a central server. Each of the PCs 2210 may be provided with local persistent storage including, for example, a hard disk drive, flash memory and/or other forms of persistent readable and writable memory. An Application Program Interface (API) 2214 intermediates communication between the PC 2210 and the legacy gaming machine software, storage and electronics. Preferably, the API should be examined by the appropriate local gaming authorities and appropriately certified. For ease of reference below, the PC 2210 will be referred to as the "PC proxy" herein below. Advantageously and according to an embodiment of the present invention, each of the legacy gaming machines 2208, 2228, 2248, 2268 is simply seen, from the deploy server's 2202 point of view, as another (e.g., Windows®) PC, and no longer as a legacy gaming machine.

Functionally, the PC proxy may be configured to communicate with the deploy server 2202 and the deploy server library 2204 to enable the legacy gaming machine to enforce policies set by the deploy server and to implement functionality for which the legacy gaming machine was not originally configured. In particular, the proxy PC may enable new software, updates and/or media files (for example) to be securely downloaded and installed onto the legacy gaming machine in a fully secure, trusted and auditable manner. In particular, embodiments of present invention enable new software to be packaged and wrapped in a secure (by a certificate, for example) package and downloaded to the PC proxy 2210 within the legacy gaming machine, as if the legacy gaming machine had that native capability—that is, as if it were not a legacy gaming machine. According to one embodiment of the present invention, the secure package may be or include a code signed MSI installation package. The MSI package may then be verified in the manner described above, unpacked and transferred from the PC proxy's local storage 2212 to the legacy gaming machine's own storage via an API, as referenced at 2214. As the transfer occurs within the secured and locked physical cabinet of the legacy gaming machine, the transfer is controlled, trusted and secure.

According to an embodiment of the present invention, the code that is wrapped in the MSI package that is downloaded from the deploy server library 2204 to the proxy PC by the deploy server 2202 (or pulled from the deploy server 2202 by the proxy PC 22210) may not be compatible and/or executable to the proxy PC itself. Indeed, the files contained in the MSI package may be considered, from the PC proxy's point of view, to be data files, as they are not compatible with or executable by the PC proxy. Therefore, the individual software components wrapped in the code signed MSI installation package need not be code signed themselves. According to an embodiment of the present invention, only the MSI package itself may be code-signed with a unique certificate and the appropriate Software Restriction Policy is configured to enable installation (execution) of this MSI package. The selected non-executable (non-executable to the PC proxy, but executable to the legacy gaming machine) files may receive at least a part number (and preferably a version number as well) that is used in the subject name of the certificate associated with the MSI package. Consequently, according to embodiments of the present invention, when the MSI package is installed within the PC proxy 2210, the certificate may be verified in the same manner as described above. Information similar to that shown and detailed relative to FIG. 3 may be attached to the MSI package. Therefore, the non-executable (to the PC proxy) files that were unwrapped through the execution of the MSI package may now be trusted as having been obtained from a trusted and authorized source—namely; the deploy server library 2204. After the MSI package has been unwrapped and verified (the installation will fail if the verification fails), the API 2214 may transfer the constituent software components of the unwrapped MSI package from the PC proxy local storage 2212 to the persistent storage of the legacy gaming machine as needed and installed. Note that no communication is necessary between the PC proxy and the deploy server 2202 when the MSI package is installed.

According to an embodiment of the present invention, when the API is to transfer the files wrapped in the MSI package to the legacy gaming machine, a preliminary step may be carried out to execute the MSI, which automatically verifies (e.g., checks its certificate) and unwraps it. If the MSI package is corrupted, the installation will fail and the API will not be able to transfer the contained files to the legacy gaming machine.

Many legacy gaming machines do not include writable storage or the write features of the storage may have been disabled, as it is typically not allowed to reprogram the storage on the casino floor. Some legacy gaming machines include one or more ROMs (on the legacy gaming machine's motherboard, for example) on which the game software (including executables, configuration and/or media files, for example) may be stored. Typically, the ROM(s) and/or Electrically Erasable ROM(s) (EEPROM(s)) are produced, or are received from a supplier and then are checked by an approved game laboratory. After the ROMs have passed the prescribed gaming laboratory tests, they may be clearly marked and/or sealed with unalterable labels. To enable such legacy gaming machines to receive new trusted software components, embodiments of the present invention include provisions for one or. more ROM emulators. The ROM emulator(s) are disposed within the secured locked cabinet of the legacy gaming machine and subject to the same physical security within the enclosure as are the legacy gaming machine's own native ROM(s), whereby access to the ROM emulator(s) may be restricted by multiple layers of keys locks and tamper detectors. The API 2214 may then communicate with the ROM emulator, as referenced at 2244 in FIG. 22. The ROM emulator may be coupled to the proxy PC 2210 in any known manner such as, for example, an Ethernet or serial port. If the legacy gaming machine includes more than one ROM, a multi-ROM emulator may be used, or the legacy gaming machine may be configured with a corresponding number of separate ROM emulators. The ROM emulator duplicates (provide an emulation of) the functions of the legacy gaming machine's ROM, so that the emulated ROM appears, to the legacy gaming machine, to behave like the legacy gaming machine's own native ROM. In effect, providing one or more ROM emulators within the locked enclosure of the gaming machine and in communication with the API 2214 and with the PC proxy 2210 enables the legacy gaming machine to emulate a manual change of the ROM(s) and/or EEPROM(s).

This emulation uses a secure ROM/EEPROM emulator 2244 whose software image may be downloaded through the trusted and secure mechanism described herein, through code signed MSI installation packages downloaded from a deploy server to the PC proxy 2210 disposed within the secure and locked enclosure of the legacy gaming machine. In this manner, the ROM/EEPROM emulator(s) 2244 effectively bypass the existing ROM(s) and/or EEPROM(s) within the legacy gaming machine. According to an embodiment of the present invention, in the case wherein the legacy gaming machine includes a plurality of ROMs and/or EEPROMs, the ROMIEEPROM emulators or the multi ROM/EEPROM emulators bypass selected ones of the ROM(s)/EEPROM(s) by plugging an emulator probe into each of the ROM(s)/EEPROM(s) to be emulated.

The combination of the PC proxy 2210, the API 2214 and the ROM emulator (if one is needed) provides the legacy gaming machine with powerful new functionalities. For example, the local storage of the PC proxy 2210 may store a plurality of MSI packages (or equivalent digital certificate-bound package), each of which may impart the legacy gaming machine with new or updated functionality. For example, each legacy gaming machine may display a menu of authorized games that is dynamically generated without requiring the deploy server 2202 to dispatch the list of authorized games or having each legacy gaming terminal fetch the list of authorized games from the deploy server 2202. This may be done by having each legacy gaming machine check the policies enforced on the games by, for example, having a process in each legacy gaming terminal attempt to execute the entry point for each game. Download of any required code signed MSI installation package(s) from the deploy server library 2204 may occur as soon as the associated Software Installation Policies are enforced (and the SRPs for the MSI installation package is permitted accordingly). Therefore, scheduling of the download from the deploy server 2202 to the PC proxy within the legacy gaming machine may be achieved by simply enforcing the associated software installation policies at a given time; this may be accomplished by having an operator manually enforcing the SIP or having a process automatically enforcing the SIP at a predetermined time via the API. Enforcing a policy may be achieved by linking the selected policy to the selected policy object in the domain controller active directory. Note that the downloads of MSI packages from the deploy server library 2204 to the PC proxy within the legacy gaming machine may be carried out while a player is playing the legacy gaming machine. If the execution of the MSI package succeeds, then the game is authorized and may be added to the games menu offered to the player. If the execution is denied (SRP is unlinked or the security level is disallowed), then the game is not authorized and it is removed from the games menu offered to the player. Similarly, if a game entry software component file is not found, then the software is not installed or has been removed and is removed from the games menu offered to the player. The process of dynamically generating the game selection menu may be optimized in many ways in order to reduce the game time to start overhead to check if it is authorized.

When the player selects a game from the dynamically generated menu of games available on the legacy gaming machine, the proxy PC 2210 may select the corresponding MSI package (or equivalent secure package) stored in its local storage 2212, unwrap (unpack) it (and, in so doing, check its certificate) and transfer the contents thereof to the ROM emulator 2244 for execution. Alternatively, the appropriate MSI package may be fetched by the PC proxy 2210 from the deploy server library 2204 through the deploy server 2202 if the MSI package corresponding to the requested game is not present in the PC proxy's local storage 2212. Thereafter, the fetched MSI package may be checked, unpacked and transferred locally from the PC proxy's local storage 2212 to the writable store and/or ROM emulator of the legacy gaming machine via the API 2214, from within the secured cabinet of the legacy gaming machine.

Game activation and deactivation may be carried out within the legacy gaming machine in the same manner as described above. Specifically, game activation that authorizes execution of the game may be achieved by enforcing the associated Software Restriction Policies. Enabling enforcement of policies as described relative to FIG. 15 and FIG. 16 may be carried out interactively by an authorized user at predetermined authorized times, or alternatively may be controlled by a process at predetermined authorized times via the appropriate API. At the deploy server 2202, a user or a process may verify a change in the list of games to be made available to players on a selected set of the legacy gaming machines. In case of a schedule change (or for other reasons such as introducing a new game or revoking an existing game), policies on the domain controller may be changed accordingly either interactively by a user in the Group Policy Management console as described for FIG. 15 and FIG. 16, or by a process via equivalent APIs. Note that the policy to be enforced by each of the legacy gaming machines may be changes in a closed loop manner, as described relative to FIG. 18.

Each code signed MSI package is verified each time that it is executed. Should the verification fail, so would the execution of the installation package. However, a global verification procedure may be forced on the legacy gaming machine(s) in a manner similar to that shown in and described above relative to FIG. 9. Such a global verification procedure may be configured to verify each of the MSI packages stored in the PC proxy's local storage 2212. For example, this global verification procedure may be carried out by forcing a reboot of the PC proxy 2210 and optionally a reboot/restart of the legacy gaming machine. Indeed, the PC proxy may be configured to check the certificates of each MSI package (e.g., to check all files having the .msi extension or functional alternative) stored within its local storage. Should any of the locally stored MSI packages fail verification, execution (e.g., installation) thereof would be prevented and/or the MSI package itself deleted or otherwise disabled. From the foregoing, it is apparent that the MSI packages stored in the PC proxy's local storage are secure and may be trusted.

It is to be noted that when a player at a legacy gaming machines such as shown in FIG. 22 wins an amount equal to or greater than a predetermined amount ($50,000 in some jurisdictions) in a casino, there is a requirement to check the integrity of the gaming application. When this occurs, the legacy gaming machine may be powered-down and the ROM(s) on which the gaming software is loaded may be extracted in order to be verified in a trusted verifier named a "Kobetron". The Kobetron produces a signature for each of the ROMs that is compared with the corresponding signature produced by the certification lab. In this manner, the integrity of the all the software components of the legacy gaming terminal, including the operating system, the game application and the configuration data may be verified, which game application and configuration data includes game application and data obtained from one of the MSI packages stored in the PC proxy's local memory. According to embodiments of the invention, when executing the global verification process subsequent to booting up the legacy gaming terminal, a verification equivalent to a "Kobetron verification" may be performed. This metaphor helps greatly in the acceptability of downloadable game technology by game regulators who are reluctant to accept state-of-the-art operating systems, multimedia and network technologies. Indeed, although the legacy gaming machine has been provided with all of the advantages and new functionalities described herein, it continues to operate in exactly the same manner as was previously certified. This is because the legacy gaming machine is "unaware" of the presence of the PC proxy 2210, of the API 2214 and of any ROM emulator(s) present therein, as it executes whatever code is loaded in its writable storage and/or ROM emulator(s), whether such code is native to the legacy gaming machine or loaded from a recently downloaded MSI (or equivalent code signed) package.

Figure 23:
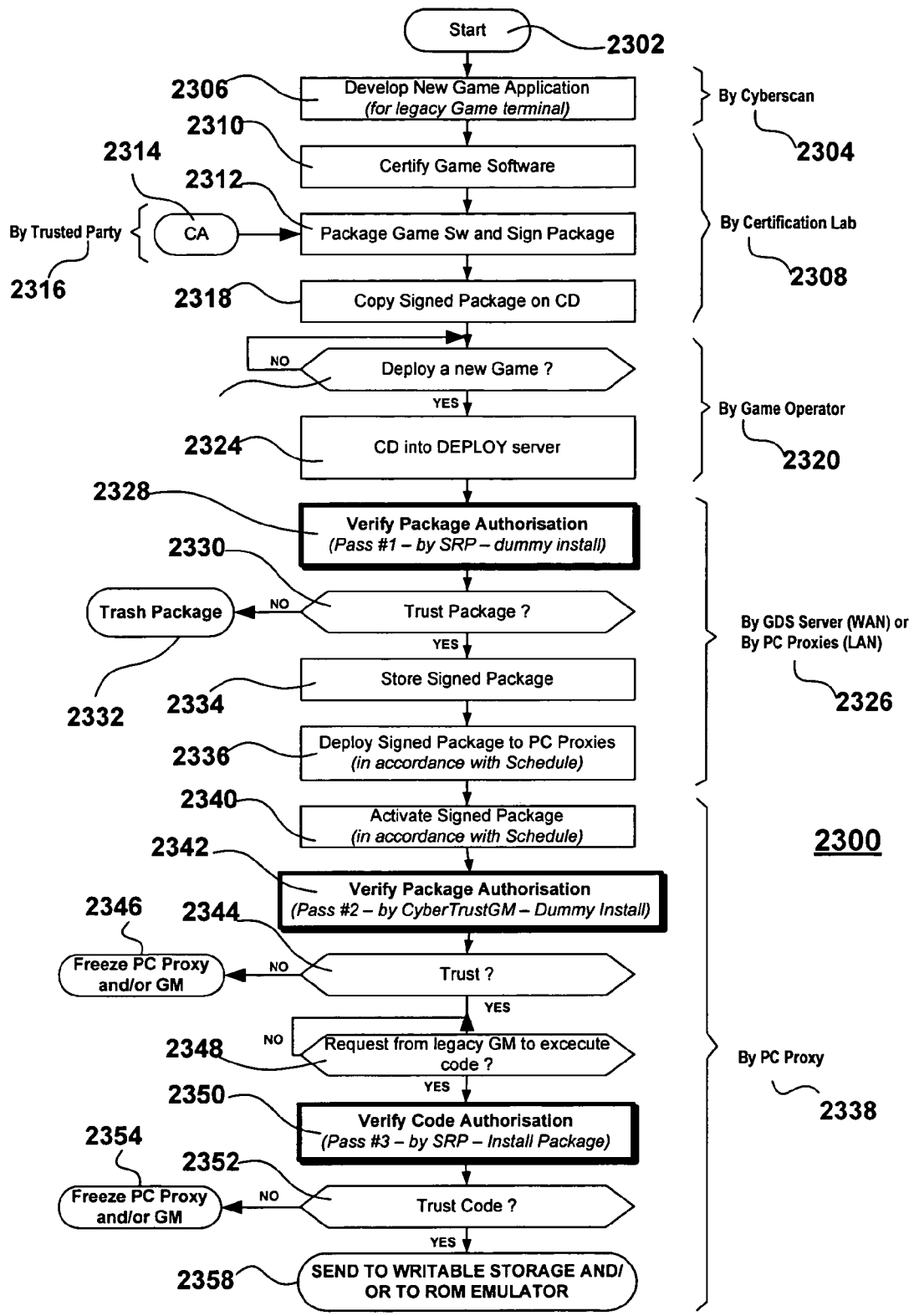
FIG. 23 illustrates an exemplary cycle from the moment a new game is created until it is first executed on a legacy gaming terminal, according to an embodiment of the present invention.

FIG. 23 illustrates an exemplary cycle from the moment a new game is created until it is first executed on a legacy gaming machine, according to an embodiment of the present invention. Reference numeral 2300 in FIG. 23 illustrates an exemplary cycle from the moment a game is being created until it is first executed on a legacy gaming machine, according to an embodiment of the present invention. The flowchart 2300 starts at 2302 when the decision to initiate a project to develop and release a new or updated game is made. The game developer (Cyberscan here, for illustrative purposes only) 2304 develops a new game application 2306 for a legacy gaming machine whose code must be certified at 2310 by a recognized certification lab 2308. The executable software components (executable by the legacy gaming machine but not by the PC proxy 2210) may not be directly code-signed but may be packaged in code-signed MSI installation packages signed, for example, with a unique PKI certificate whose subject name contains part number, version and friendly name identifiers for the MSI's content (or functionally equivalent) package. The MSI package may be signed as shown at 2312 using PKI certificates produced by a certificate issuing authority (CA) 2314 controlled by a trusted party 2316. The trusted party 2316 may be the certification lab 2308. The MSI packages together with scripts may then be copied to a removable media, such as a CD-ROM 2318 for example.

The game operator 2320 receives the CD-ROM and when it decides to deploy the new game 2322, the game operator may copy the MSI installation package(s) and any associated scripts from the removable media into the deploy server library 2204 coupled to the deploy server 2202. The scripts contain automation tasks such as copying to the repository and configuring the policies. The case of legacy gaming machines connected in a LAN may advantageously be controlled by the policies as soon as they are enforced. The Software Installation Policies (SIPs) controlling the installation of the content of the MSI package automatically execute the MSI installation packages upon policy enforcement, provided the corresponding Software Restriction Policies have been configured to authorize the execution of the MSI installation packages. This process is performed at 2328, 2330. If no SRP authorizes the execution of the MSI installation packages, the installation may be ignored or aborted, as shown at 2332. When the MSI installation package is authorized to execute, the software components and other files contained in the package may be copied to the PC proxy's local storage for later transfer to the legacy gaming machine's writable storage and/or ROM emulator, as suggested at reference numeral 2334, 2336. Other configuration tasks may also be carried out during the Microsoft installer installation process such as, for example, setting the Windows registry, setting shortcuts and installing software patches.

Download of the game software components from the deploy server library 2204 to the PC proxy 2210 of the gaming terminals may occur as soon as the associated Software Installation Policies are enforced (and the SRPs for the MSI installation package is permitted accordingly). Alternatively, a Software Management System (e.g. Microsoft SMS) may be employed to deploy the signed packages to the selected PC Proxies instead of using Software Installation Policies (SIP); in that case, Software Restriction Policies (SRP) may be used in a manner identical or similar as if SIPs were used. Game activation 2340 that authorizes execution of the game may also be achieved by enforcing the associated Software Restriction Policies. At this stage, a global verification process 2342, 2344 as described relative to FIG. 9 may advantageously be executed to verify the trust of each MSI package stored within the local storage of the PC proxy. Should the global verification fail, the PC proxy and the legacy gaming machine may be locked at 2346 pending servicing by an attendant.

When a player selects a game from a legacy gaming machine at 2338 from a selection menu and requests execution thereof, as shown at 2348, MSI package may be again verified as shown at 2350 before enabling, as shown at 2352, the components within the MSI package to be unpacked and transferred to the legacy gaming machine writable storage or to the ROM emulator via the API 2214, as shown at 2358. Should the verification fail, the PC proxy 2210 and the legacy gaming machine may be locked at 2354 pending servicing by an attendant.

According to an embodiment of the present invention, if the legacy gaming machine controller is a PC based controller that is capable of running Microsoft Windows® 2296 (or equivalent operating system software) controlled by policies as well as a legacy operating system 2292 (not capable of being controlled by central policies) such as Linux or other embedded operating system, another embodiment of the present invention includes a double-boot method. When the legacy operating system 2292 is booted, it is configured to execute certified software for the legacy gaming terminal 2290 from a writable mass storage 2294 such as a hard disk, a flash memory or other mass storage device. When the Windows operating system 2296 (or equivalent policy controlled operating system) is booted, it is configured to execute identically as the PC-Proxy described for 2208, 2228, 2248 and 2268, enabling secure download of software from the deploy server to the legacy terminal local storage device 2294. The certified code contained in the MSI package will be installed or copied to a location that will be accessible by the legacy operating system 2292 when booted in turn. Each of the two operating systems may be configured such that a request for re-booting to the other operating system or to the same operating may be requested by an application program executing in the booted mode. Preferably, no connection to the download network is allowed when the legacy operating system 2292 is booted such as to avoid intrusion, as it may not offer secure network communication 2206. A communication link may, however, exist when the legacy gaming machine is booted under the legacy operating system, such as to communicate with a central casino management system via the IGT SAS, IGT SuperSAS or GSA BOB casino standard protocol (IGT=International Game Technology, GSA=Game Standard Association).

According to an embodiment of the present invention, if the PC-Proxy is not joined to a domain and is therefore not able to be controlled directly by a central active directory (AD), a server having administrator access via the network to the gaming terminals may alternatively send to each gaming terminal a set of policy commands (called .ADM scripts or administrative scripts in Microsoft Windows®) that will configure the local policies (SRP, SIP, security policies and other policies). Once the local policies are configured and activated (by rebooting or by a policy update command), the PC-Proxy behaves identically as if an AD had directly forwarded the policies. The administrator password may advantageously be controlled from the remote server and set to a random password only known to the server software such that no human person has knowledge of it and may logon to a gaming terminal. The random password may be generated individually for each gaming terminal.

While the foregoing detailed description has described preferred embodiments of the present invention, it is to be understood that the above description is illustrative only and not limiting of the disclosed invention. Thus, the present invention should be limited only by the claims as set forth below.

What is claimed is:

1. A gaming machine, comprising: a locked enclosure; a first computing device disposed within the locked enclosure, the first computing device being programmed to enable game play of the gaming machine; a second computing device controlled by policies and disposed within the locked enclosure of the gaming machine, the second computing device being configured for network access, and an interface between the first and the second computing devices, wherein the second computing device is configured to receive game software components over the network that are compatible with the first computing device but not compatible with the second computing device and to transfer the received game software components to the first computing device over the interface, and wherein the first computing device is configured to execute the game software components received by the second computing device, and wherein the second computing device is configured so as to be unable to execute the received game software components.

2. The gaming machine of claim 1, wherein the gaming machine is a non PC-based gaming machine.

3. The gaming machine of claim 1, wherein the gaming machine is a PC-based gaming machine that is not capable of securely receiving game software components over the network.

4. The gaming machine of claim 1, wherein the second computing device includes a PC.

5. The gaming machine of claim 1, wherein the second computing device runs a version of the Microsoft Windows® operating system.

6. The gaming machine of claim 1, wherein the policies are controlled by .ADM administrative scripts or equivalent commands configured by a central server.

7. The gaming machine of claim 1, wherein the second computing device is configured with a local password that is configured by a central server.

8. The gaming machine of claim 1, wherein the second computing device is configured with a local password that is configured randomly by a central server.

9. A gaming machine, comprising:
a locked enclosure;
a first computing device disposed within the locked enclosure, the first computing device including a ROM and being programmed to enable game play of the gaming machine;
a second computing device controlled by policies and disposed within the locked enclosure of the gaming machine, the second computing device being configured for network access, and
an interface between the first and the second computing devices, the interface including a ROM emulator;
wherein the second computing device is configured to receive game software components over the network that are compatible with the first computing device but not compatible with the second computing device and to transfer the received game software components to the first computing device over the interface, the received game software components transferred via the interface being executable by the first computing device, and wherein the first computing device is configured to execute the game software components received by the second computing device, and wherein the second computing device is configured so as to be unable to execute the received game software components.

10. A gaming machine, comprising:
a locked enclosure;
a first computing device disposed within the locked enclosure, the first computing device including a plurality of ROMs and being programmed to enable game play of the gaming machine;
a second computing device controlled by policies and disposed within the locked enclosure of the gaming machine, the second computing device being configured for network access, and
an interface between the first and the second computing devices, the interface including a multi-ROM emulator configured to couple to selected ones of the plurality of ROMs;
wherein the second computing device is configured to receive game software components over the network that are compatible with the first computing device but not compatible with the second computing device and to transfer the received game software component to the first computing device over the interface, the received game software components transferred via the interface to the emulator is executable by the first computing device, and wherein the first computing device is configured to execute the game software components received by the second computing device, and wherein the second computing device is configured so as to be unable to execute the received game software components.

* * * * *